(12) United States Patent
Hong

(10) Patent No.: US 11,448,407 B2
(45) Date of Patent: Sep. 20, 2022

(54) AIR CONDITIONER

(71) Applicant: LG ELECTRONICS INC., Seoul (KR)

(72) Inventor: Seokpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 299 days.

(21) Appl. No.: 16/651,161

(22) PCT Filed: Jan. 11, 2018

(86) PCT No.: PCT/KR2018/000560
§ 371 (c)(1),
(2) Date: Mar. 26, 2020

(87) PCT Pub. No.: WO2019/066153
PCT Pub. Date: Apr. 4, 2019

(65) Prior Publication Data
US 2020/0232659 A1    Jul. 23, 2020

(30) Foreign Application Priority Data
Sep. 27, 2017  (KR) .................... 10-2017-00125457

(51) Int. Cl.
*F24F 1/26*         (2011.01)
*C09K 5/04*         (2006.01)
(Continued)

(52) U.S. Cl.
CPC .............. *F24F 1/26* (2013.01); *C09K 5/045* (2013.01); *C22C 38/001* (2013.01);
(Continued)

(58) Field of Classification Search
CPC ..... F24F 1/26; C09K 5/045; C09K 2205/122; C09K 2205/24; C22C 38/001;
(Continued)

(56) References Cited

U.S. PATENT DOCUMENTS 3,152,934 A * 10/1964 Lula .................. C22C 38/58
                                                    420/586
6,591,631 B1 * 7/2003 Taira .................. C09K 5/045
                                                     62/114
(Continued)

FOREIGN PATENT DOCUMENTS

JP    2001-304116 A    10/2001
JP    2011-202838 A    10/2011
(Continued)

OTHER PUBLICATIONS

Anonymous Eco: "Creating Air-Conditioned Comfort Air conditioning System", May 1, 2012, XP055774680.

*Primary Examiner* — Emmanuel E Duke
(74) *Attorney, Agent, or Firm* — Dentons US LLP

(57) ABSTRACT

An air conditioner according to the present embodiment includes: an outdoor unit including a compressor, an outdoor heat exchanger, and a main expansion device, wherein a refrigerant is circulated by a refrigerant pipe configured to connect the compressor, the outdoor heat exchanger, and the main expansion device, an indoor unit including an indoor heat exchanger; and a connection pipe configured to connect the outdoor unit and the indoor unit, wherein the air conditioner has a cooling capability between 23 kW and 35 kW, a mixed refrigerant containing R32 of 50% or more is used as the refrigerant, and the refrigerant pipe comprises a ductile stainless steel pipe having a delta ferrite matrix structure of 1% or less on a basis of a grain area.

6 Claims, 18 Drawing Sheets

| (51) | Int. Cl. | |
|---|---|---|
| | *C22C 38/00* | (2006.01) |
| | *C22C 38/02* | (2006.01) |
| | *C22C 38/42* | (2006.01) |
| | *C22C 38/44* | (2006.01) |
| | *C22C 38/58* | (2006.01) |
| | *F25B 9/00* | (2006.01) |
| | *F25B 41/00* | (2021.01) |

(52) U.S. Cl.
CPC ............ *C22C 38/002* (2013.01); *C22C 38/02* (2013.01); *C22C 38/42* (2013.01); *C22C 38/44* (2013.01); *C22C 38/58* (2013.01); *F25B 9/00* (2013.01); *F25B 41/00* (2013.01); *C09K 2205/122* (2013.01); *C09K 2205/24* (2013.01)

(58) Field of Classification Search
CPC ....... C22C 38/002; C22C 38/02; C22C 38/42; C22C 38/44; C22C 38/58; F25B 9/00; F25B 9/006; F25B 41/00; F25B 41/40; C21D 1/26; C21D 8/105; C21D 9/08; C21D 9/50; C21D 2211/001; C21D 2211/005; C21D 6/004

See application file for complete search history.

(56) References Cited

U.S. PATENT DOCUMENTS

| | | | | |
|---|---|---|---|---|
| 7,021,069 | B2* | 4/2006 | Taira | C09K 5/045 |
| | | | | 62/149 |
| 2003/0089124 | A1* | 5/2003 | Domyo | C09K 5/045 |
| | | | | 62/114 |
| 2006/0266439 | A1* | 11/2006 | Maziasz | C22C 38/02 |
| | | | | 148/327 |
| 2012/0024008 | A1* | 2/2012 | Okamoto | F25B 45/00 |
| | | | | 62/498 |
| 2012/0034126 | A1* | 2/2012 | Nylof | C22C 38/42 |
| | | | | 420/38 |
| 2013/0004883 | A1* | 1/2013 | Miura | C21D 1/06 |
| | | | | 72/368 |
| 2013/0174949 | A1* | 7/2013 | Hatano | C21D 8/105 |
| | | | | 251/366 |
| 2015/0275344 | A1* | 10/2015 | Katsuragi | C22C 38/00 |
| | | | | 420/42 |
| 2018/0371591 | A1* | 12/2018 | Kang | C22C 38/02 |

FOREIGN PATENT DOCUMENTS

| KR | 10-2014-0026607 A | 3/2014 |
|---|---|---|
| KR | 10-2014-0147476 A | 12/2014 |
| KR | 10-1550738 A | 8/2015 |
| WO | 2015140827 A1 | 9/2015 |
| WO | 2016104974 A1 | 6/2016 |
| WO | 2017111461 A1 | 6/2017 |

* cited by examiner

FIG. 16
(a)
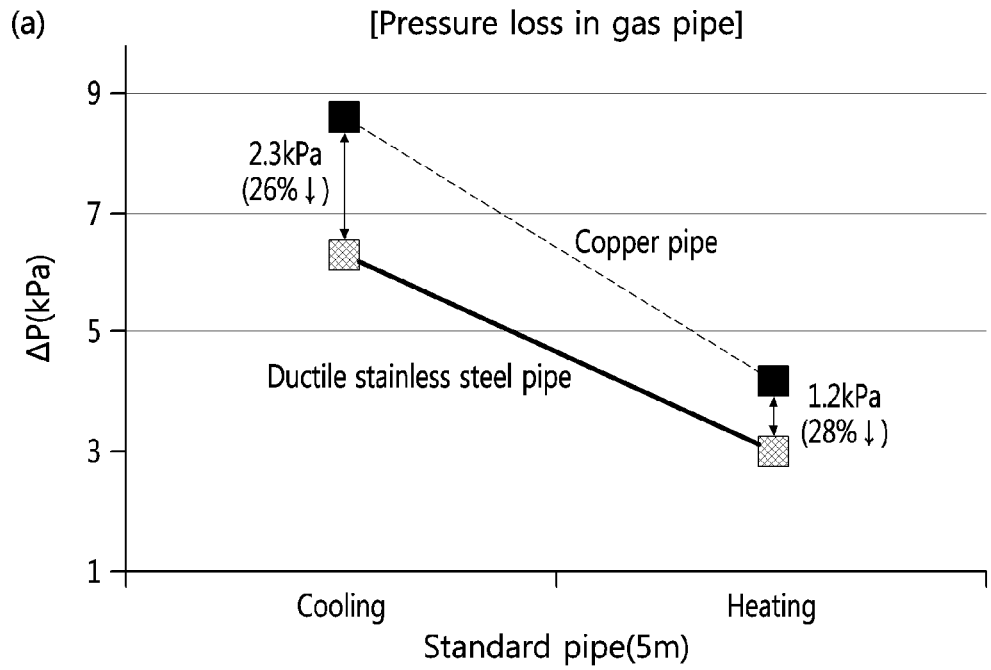
(b)
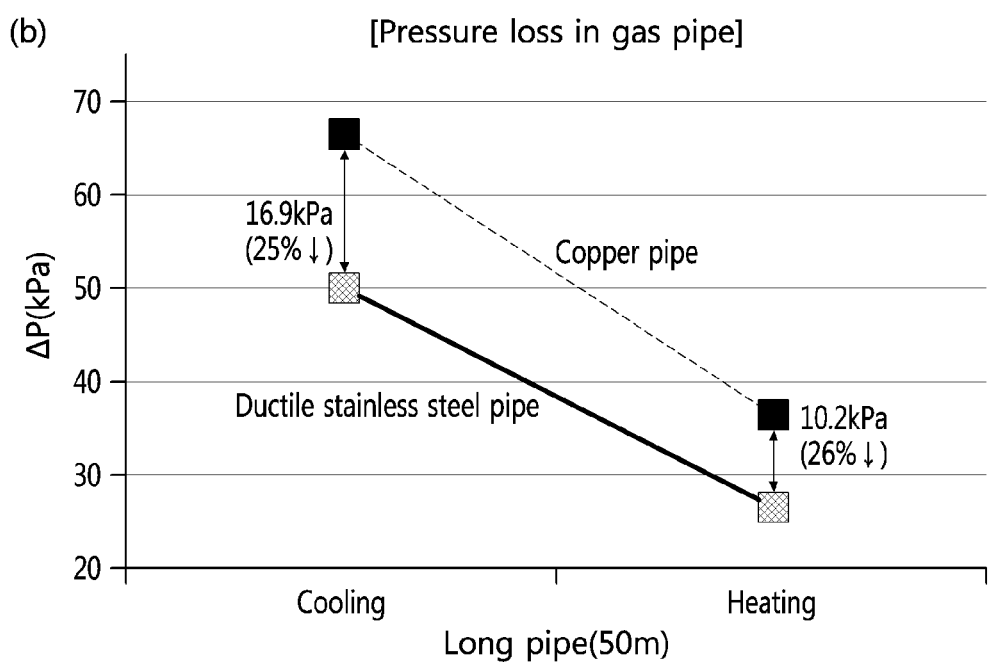

| 5 m standard | Cooling | | Heating | |
|---|---|---|---|---|
| Classification | Copper pipe(Cu) | Ductile stainless steel pipe | Copper pipe(Cu) | Ductile stainless steel pipe |
| Capacity(kW) | 9.36 | 9.45 (100.9%) | 11.28 | 11.31 (100.2%) |
| Power consumption(kW) | 2.07 | 2.06 (100.0%) | 2.55 | 2.55 (100.0%) |
| Efficiency | 4.53 | 4.58 (100.9%) | 4.43 | 4.44 (100.2%) |

(b)

| 50m long pipe | Cooling | | Heating | |
|---|---|---|---|---|
| Classification | Copper pipe(Cu) | Ductile stainless steel pipe | Copper pipe(Cu) | Ductile stainless steel pipe |
| Capacity(kW) | 7.77kW | 8.03 (103.4%) | 8.92 | 9.07 (101.7%) |
| Power consumption(kW) | 2.08kW | 2.08 (100.2%) | 2.54 | 2.53 (99.7%) |
| Efficiency | 3.74 | 3.86 (103.2%) | 3.51 | 3.58 (102.0%) |

Ductile stainless steel pipe    Aluminum pipe    $D_2$ Copper pipe

| | Corrosion depth(μm) | | | | | | | | |
|---|---|---|---|---|---|---|---|---|---|
| Smaple number | 1 | | 2 | | 3 | | Average | Maximum | Diviation |
| Measurement position | 1 | 2 | 1 | 2 | 1 | 2 | | | |
| Ductile stainless steel pipe | 8 | 9 | 26 | 25 | 36 | 9 | 19 | 36 | 12 |
| Copper pipe | 16 | 16 | 49 | 8 | 28 | 17 | 22 | 49 | 15 |
| Aluminum pipe | 91 | 64 | 95 | 105 | 104 | 110 | 95 | 110 | 17 |

FIG. 21
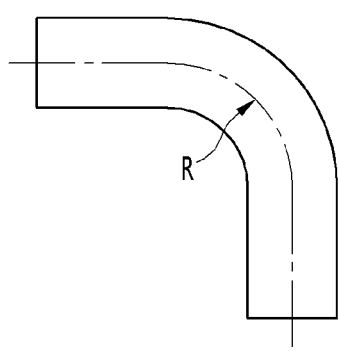
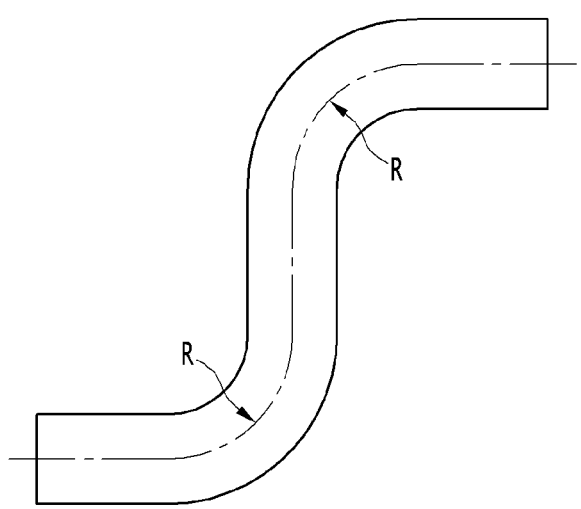

AIR CONDITIONER

This application is a National Stage Application of International Application No. PCT/KR2018/000560, filed on Jan. 11, 2018, which claims the benefit of Korean Patent Application No. 10-2017-0125457, filed on Sep. 27, 2017, all of which are hereby incorporated by reference in their entirety for all purposes as if fully set forth herein.

TECHNICAL FIELD

The present disclosure relates to an air conditioner.

BACKGROUND ART

An air conditioner may be defined as a device that supplies warm air or cold air to a room using a phase change cycle of a refrigerant.

In detail, the phase change cycle of the refrigerant may include a compressor for compressing a low-temperature low-pressure gas phase refrigerant into a high-temperature high-pressure gas phase refrigerant, a condenser for phase-changing the high-temperature and high-pressure gas phase refrigerant compressed by the compressor into a high-temperature and high-pressure liquid phase refrigerant, an expansion valve for expanding the high-temperature and high-pressure liquid refrigerant having passed through the condenser into a low-temperature low-pressure two-phase refrigerant, and an evaporator for phase-changing the low-temperature and low-pressure two-phase refrigerant having passed through the expansion valve into a low-temperature and low-pressure gas phase refrigerant When the phase change cycle of the refrigerant is operated as a device for supplying cold air, the condenser is arranged outdoors and the evaporator is arranged indoors. The compressor, the condenser, the expansion valve, and the evaporator are connected by a refrigerant pipe to form a refrigerant circulation closed circuit.

A copper (Cu) pipe made of a copper material is widely used as the refrigerant pipe. However, the copper pipe has some limitations as follows.

First, when the copper pipe is used in a total heat exchanger in which water is used as a refrigerant, scales are accumulated on an inner circumferential surface of the pipe to deteriorate reliability of the pipe. That is, when the scales are accumulated on the inner circumferential surface of the copper pipe, it is necessary to perform a cleaning process for cleaning the inner circumferential surface of the pipe or a pipe replacement process.

Second, there is a disadvantage that the copper pipe does not have sufficient pressure resistance characteristics for withstanding a high pressure. Particularly, when the copper pipe is applied to a refrigerant circulation cycle to which a refrigerant compressed at a high pressure by a compressor, i.e., a new refrigerant such as R410a, R22, and R32 is applied, as an operating time of the refrigerant cycle is accumulated, the cooper pipe may not withstand the high pressure and thus be damaged.

Third, since the copper pipe has a small stress margin value for withstanding a pressure of the refrigerant in the pipe, it is vulnerable to vibration transmitted from the compressor. For this reason, to absorb the vibration transmitted to the copper pipe and the resultant noise, the pipe is lengthened in length and disposed to be bent in x, y, and z axis directions.

As a result, since an installation space for accommodating the copper pipe is not sufficient in an outdoor unit of an air conditioner or a washing machine using a heat pump, it is difficult to install the pipe.

Also, since copper prices are relatively high in the market, and price fluctuations are so severe, it is difficult to use the copper pipe.

In recent years, to solve these limitations, a new method for replacing the copper pipe with a stainless steel pipe is emerging.

The stainless steel pipe is made of a stainless steel material, has strong corrosion resistance when compared to the copper pipe, and is less expensive than that of the copper pipe. Also, since the stainless steel pipe has strength and hardness greater than those of the copper pipe, vibration and noise absorption capability may be superior to that of the copper pipe.

Also, since the stainless steel pipe has pressure resistance characteristics superior to those of the copper pipe, there is no risk of damage even at the high pressure.

However, since the stainless steel pipe according to the related art has excessively high strength and hardness when compared to the copper pipe, it is disadvantageous to an expansion operation for pipe connection or a pipe bending operation. Particularly, the pipe constituting the refrigerant cycle may be disposed in a shape that is bent at a specific curvature at a specific point. However, when the stainless steel pipe according to the related art is used, it is impossible to bend the pipe.

DISCLOSURE OF THE INVENTION

Technical Problem

Embodiments provide an air conditioner provided with a refrigerant pipe which is improved in workability by securing ductility at a level of a copper pipe.

Embodiments also provide an air conditioner provided with a refrigerant pipe having strength and hardness equal to or higher than those of a copper pipe.

Embodiments also provide an air conditioner which is capable of preventing a refrigerant pipe from being corroded by a refrigerant pressure condition inside the pipe or an environmental condition outside the pipe.

Embodiments also provide an air conditioner provided with a refrigerant pipe which is capable of maintaining a critical pressure above a predetermined level even if the pipe is reduced in thickness.

Embodiments also provide an air conditioner provided with a refrigerant pipe which increases in inner diameter to reduce a pressure loss of a refrigerant flowing in the pipe.

Embodiments also provide an air conditioner provided with a refrigerant pipe having improved vibration absorption capability. In particular, embodiments provide an air conditioner which is capable of reducing a length of a refrigerant pipe by allowing the refrigerant pipe to easily absorb vibration transferred from a compressor.

Embodiments also provide an air conditioner which is capable of determining an outer diameter of a refrigerant pipe according to air conditioning capacity determined based on compressor capacity.

Embodiments also provide an air conditioner which is capable of determining the inner diameter of the refrigerant pipe based on the thickness of the pipe determined according to the determined outer diameter of the refrigerant pipe and the type of the refrigerant.

Technical Solution

In order to achieve the above object, a first disclosure according to the present embodiment provides an air conditioner including: an outdoor unit including a compressor, an outdoor heat exchanger, and a main expansion device, wherein a refrigerant is circulated by a refrigerant pipe configured to connect the compressor, the outdoor heat exchanger, and the main expansion device, an indoor unit including an indoor heat exchanger; and a connection pipe configured to connect the outdoor unit and the indoor unit, wherein the air conditioner has a cooling capability between 23 kW and 35 kW, a mixed refrigerant containing R32 of 50% or more is used as the refrigerant, and the refrigerant pipe comprises a ductile stainless steel pipe having a delta ferrite matrix structure of 1% or less on a basis of a grain area.

Advantageous Effects

The air conditioner configured as above according to the present disclosure has the following effects.

It is possible to improve the operation efficiency of the air conditioner by using the refrigerant corresponding to the cooling capacity of the air conditioner.

In detail, the austenite type stainless steel pipe may be applied to secure ductility at the level of the copper pipe when compared to the stainless steel pipe according to the related art, and thus, the bent stainless steel pipe may be applied to the refrigerant circulation cycle. That is, the degree of freedom of forming the refrigerant pipe may increase when compared to the stainless steel pipe according to the related art. Also, the relatively inexpensive ductile stainless steel pipe may be used without using expensive copper pipe.

Also, since the ductile stainless steel pipe according to the embodiment has the strength and the hardness greater than those of the copper pipe while having the ductility at the level of the copper pipe, the pressure resistance may be remarkably superior to that of the copper pipe, and various kinds of new refrigerants having the high saturated vapor pressure may be used in the refrigerant cycle. There is an advantage that the so-called degree of freedom of the refrigerant increases.

Also, since the stainless steel pipe having the strength and the hardness greater than those of the copper pipe has a stress margin greater than that of the copper pipe, the vibration absorption capability may be remarkably superior to that of the copper pipe. That is to say, in case of the stainless steel pipe, it is unnecessary to lengthen the pipe so as to absorb the vibration and the noise, it may be unnecessary to bend the pipe several times. Thus, it may be easy to secure the spaced for installing the refrigerant cycle, and the manufacturing cost may be reduced by reducing the length of the pipe.

Also, since the ductility of the ductile stainless steel pipe according to the embodiment is improved, the workability of the pipe may increase. Also, since the ductile stainless steel pipe has corrosion resistance superior to that of the copper pipe, the lifespan of the pipe may be prolonged.

Also, since the suction pipe disposed adjacent to the compressor may be improved in strength to prevent the suction pipe from being vibrated and damaged. Also, since the ductility of the suction pipe increases, the suction pipe may be worked (bent) and thus easily installed in the limited space.

Also, since the suction pipe constituting the ductile stainless has the strength greater than that of the copper pipe while securing the ductility at the level of the copper pipe, the pipe may be reduced in thickness. That is, even if the pipe has a thickness less than that of the copper pipe, the limit pressure of the pipe may be maintained to reduce the thickness of the pipe.

Also, since the discharge pipe disposed at the discharge side of the compressor to allow the high-pressure refrigerant to flow therethrough may be improved in strength to prevent the discharge pipe from being vibrated and damaged. Also, since the ductility of the discharge pipe increases, the suction pipe may be worked (bent) and thus easily installed in the limited space.

Also, since the discharge pipe constituting the ductile stainless has the strength greater than that of the copper pipe while securing the ductility at the level of the copper pipe, the pipe may be reduced in thickness. That is, even if the pipe has a thickness less than that of the copper pipe, the limit pressure of the pipe may be maintained to reduce the thickness of the pipe.

As a result, the suction/discharge pipes may increase in inner diameter under the same outer diameter as the copper pipe, and the pressure loss of the refrigerant flowing through the pipe may be reduced due to the increase of the inner diameter. As the pressure loss within the pipe decreases, the flow rate of the refrigerant may increase to improve the coefficient of performance (COP) of the refrigerant cycle.

BRIEF DESCRIPTION OF THE DRAWINGS

FIG. 16 is a graph illustrating result values obtained through a test for comparing pressure losses within the pipes when each of the ductile stainless steel pipe according to an embodiment and the copper pipe according to the related art is used as a gas pipe.

FIG. 17 is a test result table illustrating performance of the ductile stainless steel pipe according to an embodiment and the copper pipe according to the related art.

FIG. 21 is view illustrating a shape in which the ductile stainless steel pipe is bent according to an embodiment.

BEST MODE

Figure 1:
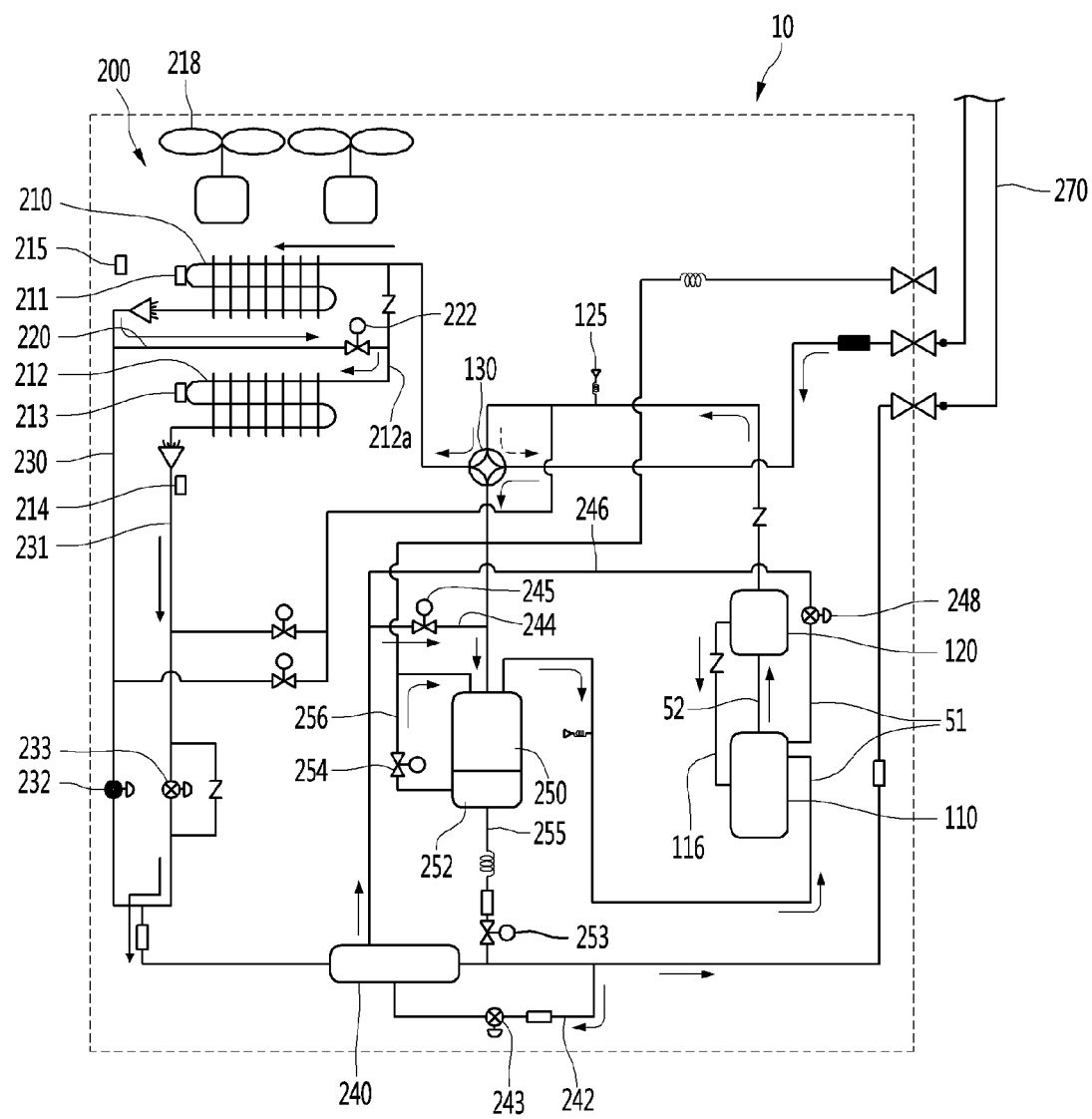
FIG. 1 is a system diagram illustrating a configuration of an outdoor unit constituting an air conditioner according to an embodiment.

Exemplary embodiments of the present disclosure will be described below in more detail with reference to the accompanying drawings. It is noted that the same or similar components in the drawings are designated by the same reference numerals as far as possible even if they are shown in different drawings. In the following description of the present disclosure, a detailed description of known functions and configurations incorporated herein will be omitted to avoid making the subject matter of the present disclosure unclear.

In the description of the elements of the present disclosure, the terms "first", "second", "A", "B", "(a)", and "(b)" may be used. However, since the terms are used only to distinguish an element from another, the essence, sequence, and order of the elements are not limited by them. When it is described that an element is "coupled to", "engaged with", or "connected to" another element, it should be understood that the element may be directly coupled or connected to the other element but still another element may be "coupled to", "engaged with", or "connected to" the other element between them.

FIG. 1 is a system diagram illustrating a configuration of an outdoor unit constituting an air conditioner according to an embodiment.

Referring to FIG. 1, the air conditioner according to the embodiment includes an outdoor unit 10 disposed outdoors and an indoor unit (not shown) disposed indoors. The indoor unit includes an indoor heat exchanger that exchanges heat with air in the indoor space.

The outdoor unit 10 includes a compressor 110 and an oil separator 120 disposed at an outlet side of the compressor 110 to separate oil from a refrigerant discharged from the compressor 110. The compressor 110 may include an inverter scroll compressor.

The outdoor unit 10 includes a recovery passage 116 for recovering oil from the oil separator 120 to the compressor 110. A high pressure sensor 125 for detecting the discharge high pressure of the refrigerant discharged from the compressor 110 and a flow switcher 130 for guiding the refrigerant passing through the high pressure sensor 125 to the outdoor heat exchanger 200 or the indoor unit side are provided at the outlet side of the oil separator 120.

When the air conditioner performs a cooling operation mode, the refrigerant flows into the outdoor heat exchanger 200 by the flow switcher 130 (see a solid arrow). On the other hand, when the air conditioner performs a heating operation mode, the refrigerant flows into the indoor heat exchanger side of the indoor unit by the flow switcher 130 (see a dotted arrow).

When the air conditioner performs a cooling operation mode, the refrigerant passing through the outdoor heat exchanger 200 may flow into a supercooling heat exchanger 240. The supercooling heat exchanger 240 may be understood as an intermediate heat exchanger that exchanges heat with the first refrigerant passing through the outdoor heat exchanger 200 and the first refrigerant after a portion of the first refrigerant (second refrigerant) is branched and expanded.

The outdoor unit 10 includes a supercooling passage 242 through which the second refrigerant is branched. The supercooling flow passage 242 is provided with a supercooling expansion device 243 for depressurizing the second refrigerant. The supercooling expansion device 243 may include an electric expansion valve (EEV).

The second refrigerant heat-exchanged in the supercooling heat exchanger 240 passes through a gas-liquid separator 250 and then flows into the compressor 110, or directly flows into the compressor 110. The gas-liquid separator 250 is a device that separates the two-phase refrigerant passing through the supercooling heat exchanger 240 into liquid and gas, and allows only the gaseous refrigerant to flow into the compressor 110.

In detail, the supercooling passage 242 is branched into a first guide passage 244 for guiding the refrigerant to the gas-liquid separator 250 and a second guide passage 246 for guiding the refrigerant to the compressor 110.

The first guide passage 244 is provided with a supercooling bypass valve 245 for selectively blocking the flow of the refrigerant. The amount of refrigerant flowing into the gas-liquid separator 250 may be adjusted according to the on/off or opening degree of the supercooling bypass valve 245.

The second guide passage 246 is provided with an injection valve 248 that can adjust the amount of the refrigerant injected into the compressor 110. The injection valve 248 may include an EEV. The amount of the refrigerant injected into the compressor 110 may be adjusted according to the on/off or opening degree of the injection valve 248.

The outdoor unit 10 includes a receiver 252 for storing at least a portion of the first refrigerant passing through the supercooled heat exchanger 240, and a receiver inlet passage 255 branched from the outlet side of the supercooling heat exchanger 240 to the receiver 252 to guide the flow of the refrigerant.

The receiver 252 may be coupled to the gas-liquid separator 250. That is, the receiver 252 and the gas-liquid separator 250 may be partitioned inside the refrigerant storage tank. For example, the gas-liquid separator 250 is provided at an upper portion of the refrigerant storage tank, and the receiver 252 is provided at a lower portion thereof.

The receiver inlet passage 255 is provided with a receiver inlet valve 253 for controlling the flow of the refrigerant. When the receiver inlet valve 253 is opened, at least a portion of the first refrigerant may be introduced into the receiver 252. The receiver inlet passage 255 may be provided with a decompression device to depressurize the refrigerant flowing into the receiver 252. The receiver 252 may be integrally coupled with the gas-liquid separator 250, and heat may be transferred from the receiver 252 to the gas-liquid separator 250. The liquid refrigerant in the gas-liquid separator 250 may be evaporated into the gaseous refrigerant by the transferred heat, so that the amount of the low-pressure gaseous refrigerant flowing into the compressor 110 may be increased.

The receiver 252 is connected to a receiver outlet pipe 256. The receiver outlet pipe 256 may extend to the gas-liquid separator 250. At least a portion of the refrigerant stored in the receiver 252 may be introduced into the gas-liquid separator 250 through the receiver outlet pipe 256.

The receiver outlet pipe 256 is provided with a receiver outlet valve 254 that can adjust the amount of the refrigerant discharged from the receiver 252. The amount of the refrigerant flowing into the gas-liquid separator 250 may be adjusted according to the on/off or opening degree of the receiver outlet valve 254.

Meanwhile, the first refrigerant passing through the supercooling heat exchanger 240 may flow into the indoor unit through the connection pipe 270.

Hereinafter, the configuration of the outdoor heat exchanger 200 will be described.

The outdoor heat exchanger 200 includes a plurality of heat exchangers 210 and 212 and an outdoor fan 218. The plurality of heat exchange parts 210 and 212 include a first heat exchanger 210 and a second heat exchanger 212 connected in parallel.

The outdoor heat exchanger 200 includes a variable passage 220 that guides the flow of the refrigerant from the outlet side of the first heat exchanger 210 to the inlet side of the second heat exchanger 212. The variable passage 220 extends from a first outlet pipe 230, which is the outlet pipe of the first heat exchanger 210, to the inlet pipe 212a, which is the inlet pipe of the second heat exchanger 212.

The outdoor heat exchanger 200 is provided with a first valve 222 provided to the variable passage 2200 to selectively block the flow of the refrigerant. The refrigerant passing through the first heat exchanger 210 may selectively flow into the second heat exchanger 212 according to whether the first valve 222 is on or off.

In detail, when the first valve 222 is turned on or opened, the refrigerant passing through the first heat exchanger 210 flows into the inlet pipe 212a through the variable passage 220 and is heat-exchanged in the second heat exchanger 212. The refrigerant passing through the second heat exchanger 212 may flow into the supercooling heat exchanger 240 through the second outlet pipe 231.

On the other hand, when the first valve 222 is turned off or closed, the refrigerant passing through the first heat exchanger 210 may flow into the supercooling heat exchanger 240 through the first outlet pipe 230.

The first outlet pipe 230 is provided with a second valve 232 for controlling the flow of the refrigerant, and the second outlet pipe 231 is provided with a third valve 233 for controlling the flow of the refrigerant. The second valve 232 and the third valve 233 may be connected in parallel.

When the second valve 232 is opened or its opening degree is increased, the amount of the refrigerant flowing through the first outlet pipe 230 is increased. When the third valve 233 is opened or its opening degree is increased, the amount of the refrigerant flowing through the second outlet pipe 231 is increased.

The first outlet pipe 230 and the second outlet pipe 231 are jointed and connected to the inlet side pipe of the supercooling heat exchanger 240.

The outdoor heat exchanger 200 includes a plurality of temperature sensors 211, 213, and 214. The plurality of temperature sensors 211, 213, and 214 may include a first temperature sensor 211 provided to the first heat exchanger 210, a second temperature sensor 213 provided to the second heat exchanger 213, and the third temperature sensor 214 provided to the second outlet pipe 231.

The first temperature sensor 211 and the second temperature sensor 213 may be disposed in the refrigerant pipe of the first heat exchange part 210 and the refrigerant pipe of the second heat exchange part 212, respectively.

The outdoor unit 10 may further include an outdoor temperature sensor 215 for detecting the temperature of the outside air.

Hereinafter, the refrigerant flow pattern at the time of performing the cooling operation will be described with reference to the drawings.

In detail, when the air conditioner performs the cooling operation mode, the high-temperature and high-pressure gaseous refrigerant passing through the compressor 110 and the oil separator 120 flows into the outdoor heat exchanger by the flow switcher 130. The refrigerant flowing into the outdoor heat exchanger 200 passes through both the first heat exchanger 210 and the second heat exchanger 212.

In detail, when the outside temperature condition or the discharge high pressure condition of the compressor meets a preset condition, the air conditioner may perform a normal cooling operation mode.

When the normal cooling operation mode is performed, the first valve 222 is turned on or opened, the second valve 232 is closed, and the third valve 233 is opened.

Therefore, the refrigerant heat-exchanged in the first heat exchanger 210 flows into the second heat exchanger 212 through the variable passage 220 and the inlet pipe 212a. The flow of the refrigerant to the first outlet pipe 230 is limited.

The refrigerant heat-exchanged in the second heat exchanger 212 may flow into the supercooling heat exchanger 240 through the second outlet pipe 231. Since the flow of the refrigerant flowing into the supercooling heat exchanger 240 has been described above, a redundant description thereof will be omitted.

[Refrigerant]

The refrigerant may circulate through the outdoor unit 10 and the indoor unit to perform the cooling or heating operation of the air conditioner system 10. For example, the refrigerant may include R21 or R134a as a single refrigerant.

The R32 is a methane-based halogenated carbon compound and expressed by Formula $CH_2F_2$. The R32 is an eco-friendly refrigerant having ozone depletion potential (ODP) less than that of the R22 (Chemical Formula: $CHCLF_2$) according to the related art, and thus, a discharge pressure of the compressor is high.

The R134a is an ethane-based halogenated carbon compound and expressed by Formula $CF_3CH_2F$. The R134a may be used for the air conditioner including the air conditioner as a refrigerant replacing the R12 (Chemical Formula: $CCl_2F_2$) according to the related art.

For another example, the refrigerant may include R410a as a non-azeotropic mixed refrigerant.

The R410a is a material in which the R32 and R125 (Chemical Formula $CHF_2CF_3$) are mixed at a weight ratio of 50:50. When the refrigerant is evaporated (saturated liquid=>saturated gas) in the evaporator, a temperature increases, and when the refrigerant is condensed (saturated gas=>saturated liquid) in the condenser, the temperature decreases. As a result, heat exchange efficiency may be improved.

For another example, the refrigerant may include R407c as a non-azeotropic mixed refrigerant. The R407c is a material in which the R32, the R125, and the R134a are mixed at a weight ratio of 23:25:52. Since the R407c has ozone destruction coefficient less than that of the R22 according to the related art and a vapor pressure similar to that of the R22, the replacement of the equipment constituting the existing refrigeration cycle may be minimized to reduce the cost.

In this embodiment, the R410a is used as the refrigerant circulating through the air conditioner.

[Refrigerant Circulation Amount]

The refrigerant may be filled into the air conditioner 10 according to an embodiment. A filling amount of refrigerant may be determined based on a length of the refrigerant pipe 170 constituting the air conditioner 10. In the present embodiment, the filling amount of the refrigerator may be 7.7 kg.

[Oil]

Oil for lubricating or cooling the compressor 100 is contained in the air conditioner 10 according to an embodiment. The oil may include a PAG-based refrigerating machine oil, a PVE-based refrigerating machine oil, or a POE-based refrigerating machine oil.

The PAG-based refrigerating machine oil is a synthetic oil made of propylene oxide as a raw material and has a relatively high viscosity and thus has excellent viscosity characteristics depending on a temperature. Thus, when the PAG-based refrigerating machine oil is used, the compressor may be reduced in load.

The PVE-based refrigerating machine oil is a synthetic oil made of ether as a raw material and has good compatibility with the refrigerant, high volume resistivity, and excellent electrical stability. For example, the PVE-based refrigerating machine oil may be used for the compressor using the refrigerant such as the R32, the R134a, the R410a, or the R407c.

The POE-based refrigerating machine oil is a synthetic oil obtained by dehydrating condensation of polyhydric alcohol and carboxylic acid and has good compatibility with the refrigerant and also has excellent oxidation stability and thermal stability in air. For example, the POE-based refrigerating machine oil may be used for the compressor using the refrigerant such as the R32 or the R410a.

In this embodiment, the PVE-based refrigerating machine oil, e.g., FVC68D may be used as the refrigerating machine oil.

[New Material Pipe]: Ductile Stainless Steel Pipe

The refrigerant pipe may include a new material pipe that is strong and having excellent workability. In detail, the new material pipe may be made of a stainless steel material and a material having at least copper (Cu)-containing impurities. The new material pipe has strength greater than that of a copper (Cu) pipe and workability superior to that of the stainless steel pipe. For example, the new material pipe may be called a "ductile stainless steel pipe". The ductile stainless steel pipe refers to a pipe made of ductile stainless steel.

When the refrigerant pipe 170 is provided as the copper pipe, a kind of refrigerant circulating through the copper pipe may be limited. The refrigerant may be different in operation pressure range according to the kind of refrigerant. If the high-pressure refrigerant having a high operation pressure range, that is, a high pressure that is capable of increasing is used for the copper pipe, the copper pipe may be broken, and thus the leakage of the refrigerant may occur.

However, when the ductile stainless steel pipe is used as the new material pipe like this embodiment, the above-described limitation may be prevented from occurring.

[Property of Ductile Stainless Steel]

The ductile stainless steel has strength and hardness less than those of the stainless steel according to the related art, but has a good bending property. The ductile stainless steel pipe according to an embodiment has strength and hardness less than those of the stainless steel according to the related art, but remains to at least the strength and hardness of the copper pipe. In addition, since the ductile stainless steel pipe has a bending property similar to that of the copper pipe, bending workability may be very good. Here, the bending property and the bendability may be used in the same sense.

As a result, since the ductile stainless steel pipe has strength greater than that of the copper pipe, the possibility of the damage of the pipe may be reduced. Thus, there is an effect that the number of types of refrigerant capable of being selected in the air conditioner increases.

[Suction Pipe of Compressor]

The refrigerant pipe includes a suction pipe 51 guiding suction of the refrigerant into the compressor 110. The suction pipe 51 may be understood as a pipe extending from supercooling heat exchanger 240 to the compressor, and a pipe extending from the gas/liquid separator 250 to the compressor 110.

The suction pipe 51 may include the ductile stainless steel pipe.

[Discharge Pipe of Compressor]

The refrigerant pipe 50 further includes a discharge pipe 52 through which the refrigerant compressed in the compressor 110 is discharged. The discharge pipe 52 may be understood as a pipe extending from a discharge portion of the compressor 110 to the oil separator 120.

The discharge pipe 52 may include the ductile stainless steel pipe. Since the high-pressure gaseous refrigerant flows through the discharge pipe 52, the outer diameter of the discharge pipe 52 may be relatively smaller than the outer diameter of the suction pipe 51.

In addition, since the high-pressure gaseous refrigerant flows through the discharge pipe 52 and thus the discharge pipe 52 largely moves by vibration occurring in the compressor 110, it is necessary to maintain the strength of the discharge pipe 52 to preset strength or more. When the discharge pipe 52 is provided as the new material pipe, the discharge pipe 52 may be maintained at high strength to prevent the refrigerant from leaking by the damage of the discharge pipe 52.

A relatively low-pressure refrigerant flows through the suction pipe 51, but the pipe is disposed adjacent to the compressor 110, the movement due to the vibration of the compressor 110 may be largely large. Thus, since the strength of the suction pipe 51 is required to be maintained to the preset strength or more, the suction pipe 51 may be provided as the new material pipe.

Hereinafter, constituents defining the characteristics of the ductile stainless steel according to an embodiment will be described. It is noted that the constitutional ratios of the constituents described below are weight percent (wt. %).

1. Composition of Stainless Steel (1) Carbon (C): 0.3% or Less

The stainless steel according to an embodiment includes carbon (C) and chromium (Cr). Carbon and chromium react with each other to precipitate into chromium carbide. Here, the chromium is depleted around a grain boundary or the chromium carbide to cause corrosion. Thus, the carbon may be maintained at a small content.

Carbone is an element that is bonded to other elements to act to increase creep strength. Thus, in the content of carbon exceeds 0.93%, the ductility may be deteriorated. Thus, the content of the carbon is set to 0.03% or less.

(2) Silicon (Si): More Than 0% and Less Than 1.7%

An austenite structure has yield strength less that that of a ferrite structure or martensite structure. Thus, a matrix structure of the stainless steel may be made of austenite so that the ductile stainless steel according to an embodiment has a bending property (degree of freedom of bending) equal or similar to that of the copper.

However, silicon is an element forming ferrite, the more a content of silicon increases, the more a ratio of the ferrite in the matrix structure increases to improve stability of the ferrite. It is preferable that the silicon is maintained to be the content of silicon as low as possible, but it is impossible to completely block introduction of silicon into impurities during the manufacturing process.

When a content of silicon exceeds 1.7%, the stainless steel has hardly ductility at a level of the copper material, and also, it is difficult to secure sufficient workability. Thus, a content of silicon contained in the stainless steel according to an embodiment is set to 1.7% or less.

(3) Manganese: 1.5% to 3.5%

Manganese acts to suppress phase transformation of the matrix structure of the stainless steel into a martensite type material and expand and stabilize an austenite region. If a content of manganese is less than 1.5%, the phase transformation suppressing effect by manganese does not sufficiently occur. Thus, to sufficiently obtain the phase transformation suppressing effect by manganese, a lower limit of a content of manganese is set to 1.5% or less.

However, as the content of manganese increases, the yield strength of the stainless steel increases to deteriorate the ductility of the stainless steel. Thus, an upper limit of the content of manganese is set to 3.5%.

(4) Chromium (Cr): 15% to 18%

Chromium is an element that improves corrosion initiation resistance of the stainless steel. The corrosion initiation refers to first occurrence of the corrosion in a state in which the corrosion does not exist in a base material, and the corrosion initiation resistance refers to a property of suppressing the first occurrence of the corrosion in the base material. This may be interpreted to have the same means as corrosion resistance.

Since the stainless steel does not have the corrosion initiation resistance (corrosion resistance) when a content of chromium is less than 15.0%, a lower limit of the content of chromium is set to 15.0%.

On the other hand, if the content of chromium is too large, the ferrite structure is formed at room temperature to reduce the ductility. Particularly, the stability of the austenite is lost at a high temperature to reduce the strength. Thus, an upper limit of the content of the chromium is set to 18.0% or less.

(5) Nickel (Ni): 7.0% to 9.0%

Nickel has a property of improving corrosion growth resistance of the stainless steel and stabilizing the austenite structure.

Corrosion growth refers to growth of corrosion that already occurs in the base material while spreading over a wide range, and the corrosion growth resistance refers to a property of suppressing the growth of the corrosion.

Since the stainless steel does not have the corrosion growth resistance when a content of nickel is less than 7.0%, a lower limit of the content of nickel is set to 7.0%.

Also, when the content of nickel is excessive, the stainless steel increases in strength and hardness, and thus it is difficult to secure sufficient workability of the stainless steel. In addition, the cost increase, and thus is not desirable economically. Thus, an upper limit of the content of the nickel is set to 9.0% or less.

(6) Copper (Cu): 1.0% to 4.0%

Copper acts to inhibit phase transformation of the matrix structure of the stainless steel into a martensite structure and improve the ductility of the stainless steel. If a content of copper is less than 1.0%, the phase transformation suppressing effect by copper does not sufficiently occur. Thus, to sufficiently obtain the phase transformation suppressing effect by copper, a lower limit of a content of copper is set to 1.0% or less.

Particularly, the content of copper has to set to 1.0% or more so that the stainless steel has a bending property equal or similar to that of the copper.

Although the more the content of copper increases, the more the phase transformation suppressing effect of the matrix structure increases, the increase gradually decreases. Also, if the content of copper is excessive to exceed 4% to 4.5%, since the effect is saturated, and the occurrence of martensite is promoted, it is not preferable. Also, since copper is an expensive element, it affects economical efficiency. Thus, an upper limit of the content of copper is set to 4.0% so that the effect of suppressing the phase transformation of copper is maintained to the saturation level, and the economical efficiency is secured.

(7) Molybdenum (Mo): 0.03% or less (8) Phosphorus (P): 0.04% or less (9) Sulfur (S): 0.04% or less

(10) Nitrogen (N): 0.03% or less

Since molybdenum, phosphorus, sulfur, and nitrogen are elements originally contained in the steel-finished product and cure the stainless steel, it is desirable to maintain the contents as low as possible.

2. Matrix Structure of Stainless Steel

When the stainless steel is classified in view of a metal structure (or matrix structure), the stainless steel is classified into austenite type stainless steel containing chromium (18%) and nickel (8%) as main components and ferrite type stainless steel containing chromium (18%) as a main component, and martensite type stainless steel containing chromium (8%) as a main component.

Also, since the austenite type stainless steel is excellent in corrosion resistance against salt and acid and has high ductility, the ductile stainless steel according to an embodiment is preferably the austenite type stainless steel.

Also, the austenite structure has yield strength and hardness less that those of the ferrite structure or the martensite structure. Furthermore, when a crystal size is grown under the same condition, an average grain size of the austenite is the largest and thus is advantageous for improving the ductility.

To improve the ductility of the stainless steel, the matrix structure of the stainless steel may be formed as only the austenite structure. However, since it is very difficult to control the matrix structure of the stainless steel with only the austenite, it is inevitable to include other structure.

In detail, the other matrix structure that affects the ductility of the austenite type stainless steels is delta ferrite (δ-ferrite) which occurs during the heat treatment process. That is, the more a content of the delta ferrite, the more the hardness of the stainless steel increases, but the ductility of the stainless steel decreases.

The stainless steel may have an austenite matrix structure of 90% or more, preferably 99% or more and a delta ferrite matrix structure of 1% or more on the base of a grain area. Thus, one of methods for improving the ductility of the stainless steels is to reduce an amount of delta ferrite contained in the austenite type stainless steel.

Even when the ductile stainless steel according to an embodiment has a delta ferrite matrix structure of 1% or less, the fact that the delta ferrite is locally distributed in a specific crystal grain rather than being uniformly distributed throughout the crystal grain is advantageous in improvement of the ductility.

[Microstructure of Ductile Stainless Steel]

Figure 2:
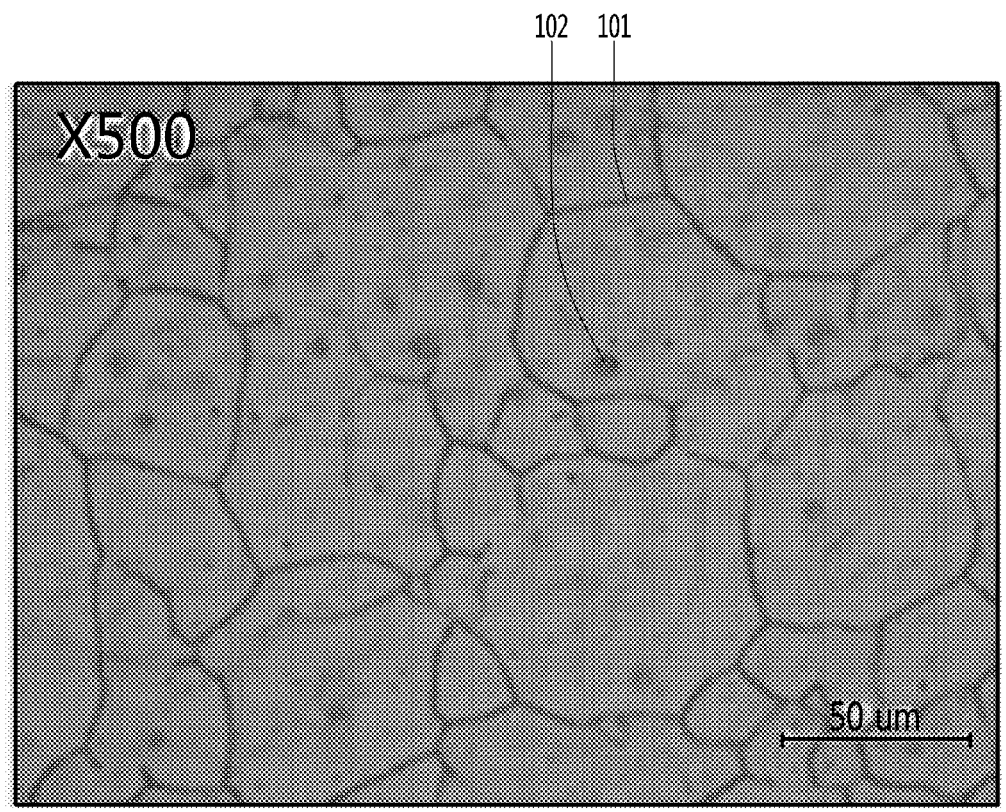
FIG. 2 is a microstructure photograph of a stainless steel having an austenite matrix structure of 99% and a delta ferrite structure of 1% or less.
Figure 3:
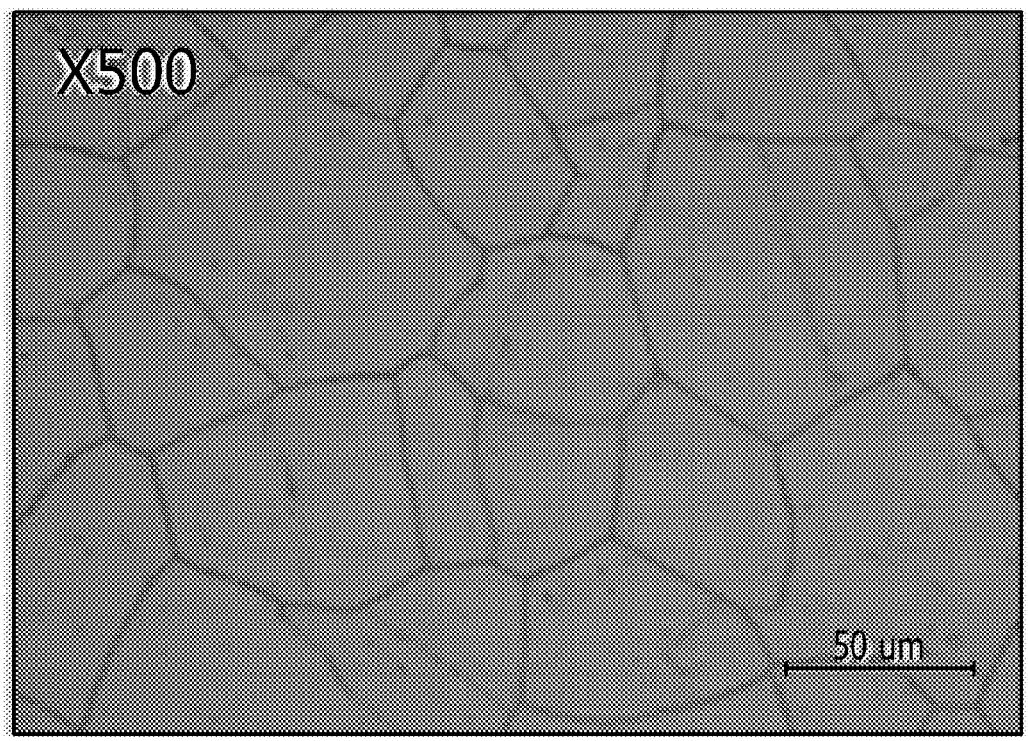
FIG. 3 is a microstructure photograph of a stainless steel having only the austenite matrix structure.

FIG. 2 is a microstructure photograph of a stainless steel having an austenite matrix structure of 99% and a delta ferrite structure of 1% or less, and FIG. 3 is a microstructure photograph of a stainless steel having only the austenite matrix structure. The stainless steel having the structure of FIG. 2 is a microstructure of the ductile stainless steel according to an embodiment.

The stainless steel of FIG. 2 and the stainless steel of FIG. 3 have average grain sizes corresponding to grain size Nos. 5.0 to 7.0. The average gain size will be descried below.

Table 1 below is a graph of results obtained by comparing mechanical properties of the stainless steel (a material 1) of FIG. 2 and the stainless steel (a material 2) of FIG. 2.

TABLE 1

| | | Mechanical Property | | | |
|---|---|---|---|---|---|
| | Kind | Yield Strength [MPa] | Tensile Strength [MPa] | Hardness [Hv] | Elongation [%] |
| Material 1 | Stainless Steel (Austenite + Delta Ferrite) | 180 | 500 | 120 | 52 |
| Material 2 | Stainless Steel (Austenite) | 160 | 480 | 110 | 60 |

Referring to Table 1, it is seen that the material 2 has a physical property less than that of the material 1 in strength and hardness. Also, it is seen that the material 2 has an elongation greater than that of the material 1. Therefore, to lower the strength and the hardness of the stainless steel, it is ideal that the stainless steel has only the austenite matrix structure. However, since it is difficult to completely remove the delta ferrite matrix structure, it is desirable to minimize a ratio of the delta ferrite matrix structure.

Also, as described above, when the delta ferrite structures are densely distributed in a specific grain rather than uniformly distributed, the effect is more effective for the ductility the stainless steel.

In FIG. 2, a large grain 101 represents an austenite matrix structure, and a small grain 102 in the form of a black spot represents a delta ferrite matrix structure.

3. Average Grain Diameter of Stainless Steel

An average grain diameter of the stainless steel may be determined according to composition and/or heat treatment conditions. The average grain diameter of the stainless steel affects the strength and the hardness of the stainless steel. For example, the more the average grain diameter decreases, the more the stainless steel increase in strength and hardness, and the more the average grain diameter increases, the more the stainless steel decrease in strength and hardness.

The ductile stainless steel according to an embodiment has properties of low strength and hardness when compared to the stainless steel according to the related art in addition to good bending property by controlling the content of copper and the grain area of delta ferrite, and also, the ductile stainless steel has strength and hardness greater than those of copper.

For this, the average grain diameter of the stainless steel is limited to 30 μm to 60 μm. An average grain diameter of a general austenite structure is less than 30 μm. Thus, the average grain diameter has to increase to 30 μm through the manufacturing process and the heat treatment.

According to the criteria of American Society for Testing and Materials (ASTM), the average grain diameter of 30 μm to 60 μm corresponds to grain size Nos. 5.0 to 7.0. On the other hand, an average grain diameter less than 30 μm corresponds to ASTM grain size No. 7.5 or more.

If the average grain diameter of the stainless steel is less than 30 μm, or the grain size number is greater than 7.0, it does not have the properties of low strength and low hardness required in this embodiment. Particularly, the average grain diameter (or the grain size number) of the stainless steel is a key factor in determining the properties of the low strength and the low hardness of the stainless steel.

Referring to Table 2 below, since the copper pipe according to the related art has physical properties of the low strength and the low hardness, the copper pipe is commercialized as the refrigerant pipe constituting the refrigerant circulation cycle, but there is a limitation of reliability due to the corrosion and pressure resistance against a new refrigerant.

Also, since the stainless steels of Comparative Examples 2 to 5 have excessively large strength and hardness in comparison to the copper pipes, there is a limitation that the workability is poor even if the limitation of the corrosion and the pressure resistance of copper are solved.

On the other hand, the stainless steel according to an embodiment has strength and hardness greater than those the copper pipes according to the related art and has strength and hardness less than those of the stainless steels of Comparative Examples 2 to 5. Therefore, since the corrosion resistance and the pressure resistance of the copper pipe are solved, it is suitable to be used as a high-pressure new refrigerant pipe such as R32.

In addition, since it has an elongation greater than that of the copper pipe, the limitation of workability of the stainless steel according to the related art may also be solved.

TABLE 2

| | | Mechanical Property | | | |
|---|---|---|---|---|---|
| | Kind | Yield Strength [MPa] | Tensile Strength [MPa] | Hardness [Hv] | Elongation [%] |
| Comparative Example 1 | Copper Pipe (C1220T) | 100 | 270 | 100 | 45 or more |
| Comparative Examples 2-5 | Stainless Steel (Grain Size No. 7.5 or more) | about 200 | about 500 | about 130 | 50 or more |
| Embodiment | Stainless Steel (Grain Size No. 5.0~7.0) | about 160 | about 480 | about 120 | 60 or more |

In summary, the ductile stainless steel defined in an embodiment may represent stainless steel which has 99% of austenite and 1% or less of delta ferrite and in which the above-described components are contained at a preset ratio.

Figure 4:
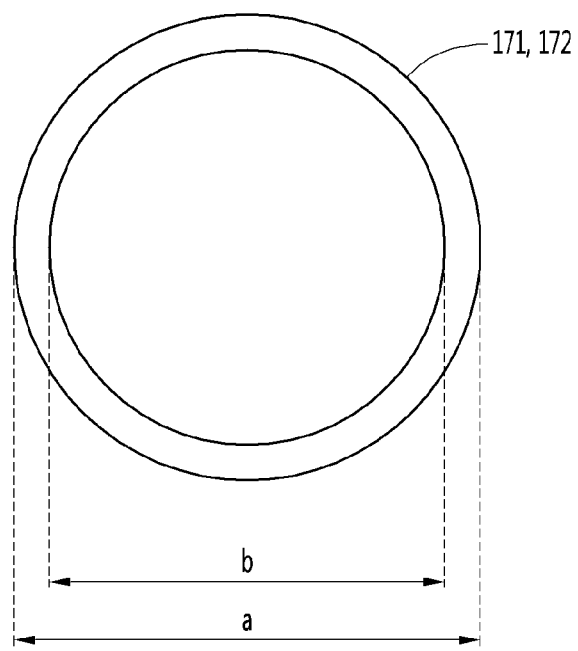
FIG. 4 is a view illustrating an outer diameter and an inner diameter of a refrigerant pipe according to an embodiment.

FIG. 4 is a view illustrating an outer diameter and an inner diameter of the refrigerant pipe according to an embodiment.

Referring to FIGS. 1 and 4, when the compressor 110 according to an embodiment is driven, the refrigerant suctioned into the compressor 110 involves a temperature change after the compression. Due to the change in temperature, a change in stress at the suction pipe 51 and the discharge pipe 52 may be more severe than other pipes.

As illustrated in FIG. 4, this embodiment is characterized in that the suction pipe 51 and the discharge pipe 52, which exhibit the most severe pressure and vibration when the refrigerant changes in phase, are formed as the ductile stainless steel pipe subjected to a ductileness process to increase allowable stress. However, the present disclosure is not limited to only the suction pipe and the discharge pipe, and any one or more pipes connecting the outdoor unit to the indoor unit may be provided as the ductile stainless steel pipe according to the variation of the stress.

The air-conditioning capacity of the air conditioner according to an embodiment may be selected in the range of 23 kW to 35 kW. An outer diameter of the ductile stainless steel pipe may be determined based on the selected air-conditioning capacity of the air conditioner.

Also, the refrigerant used in the air conditioner according to an embodiment may include the R32, the R134a, the R401a, or R407c as described above. Particularly, a thickness of the ductile stainless steel pipe may be differently determined according to kinds of refrigerants.

[Method for Setting Thickness of Ductile Stainless Steel Pipe]

A thickness of the ductile stainless steel pipe may be determined according to the following Mathematical Equation. The Mathematical Equation below is calculated based on ASME B31.1, which provides codes for standards and guidelines for a pipe, and KGS Code, which categorizes technical items such as facilities, technologies, and inspections specified by gas related laws and regulations.

$$t_m = \frac{P \times D_0}{2S + 0.8P} + T_{extra}$$ [Mathematical Equation 1]

Here, tm represents a minimum thickness of the stainless steel pipe, P represents a design pressure (Mpa), DO represents an outer diameter (mm) of the stainless steel pipe, S represents allowable stress (M/mm$^2$), and $T_{extra}$ represents a clearance thickness according to corrosion, thread working, and the like. The $T_{extra}$ is determined to be 0.2 when a material of the pipe is made of copper, aluminum, or stainless steel.

[Definition of Pipe Diameter]

As illustrated in FIG. 4, an outer diameter of the ductile stainless steel pipe used for the suction pipe 51 or the discharge pipe 52 may be defined as a, and an inner diameter may be defined as b. Referring to Mathematical Equation 1, it is seen that the minimum thickness of the pipe is proportional to the outer diameter of the pipe and inversely proportional to the allowable stress.

[Allowable Stress S]

The allowable stress represents a value obtained by dividing reference strength by a safety factor, i.e., a maximum value of stress (deformation force) that is allowed to exert weight, which is considered to be tolerable without deformation or breakage of the pipe when external force is applied to the pipe.

In this embodiment, the allowable stress standard of the ductile stainless steel pipe is derived to satisfy the code written in ASME SEC. VIII Div. 1, and the allowable stress S may be set to a relatively small value of a value obtained by dividing the tensile strength of the pipe by 3.5 or a value obtained by dividing the yield strength of the pipe by 1.5. The allowable stress may be a value that varies depending on the material of the pipe and be determined to 93.3 Mpa on the basis of the SME SEC. VIII Div. 1.

When the same stress is applied to the pipe, the stainless steel may have a stress margin greater than that of copper, and thus a degree of design freedom of the pipe may increase. As a result, to reduce the stress transmitted to the pipe, it is possible to escape the restriction that the pipe has to have a long length. For example, to reduce vibration transmitted from the compressor 110, it is unnecessary to bend the pipe several times in the form of a loop within a limited installation space.

[Outer Diameter of Ductile Stainless Steel Pipe]

Air-conditioning capacity of the air conditioner, i.e., cooling capacity or heating capacity may be determined based on compressibility of the compressor 110. Also, an outer diameter of the ductile stainless steel pipe may be determined according to the cooling capacity of the compressor. That is, the capacity of the compressor may be a criterion for determining the outer diameter of the ductile stainless steel pipe.

For example, in the air conditioner having air-conditioning capacity between 23 kW to 35 kW, when the suction pipe 51 and the discharge pipe 52 are provided as the ductile stainless steel pipes, the suction pipe 51 may have an outer diameter of 22.20 mm and the discharge pipe 52 may have an outer diameter of 15.88 mm.

[Design Pressure P According to Kind of Refrigerant]

A design pressure may be a pressure of the refrigerant and correspond to a condensation pressure of the refrigerant cycle. For example, the condensation pressure may be determined based on a temperature value (hereinafter, referred to as a condensation temperature) of the refrigerant condensed in the outdoor heat exchanger 120 or the indoor heat exchanger. Also, the design pressure may represent a saturated vapor pressure of the refrigerant at the condensation temperature. In general, the air conditioner may have a condensation temperature of about 65° C.

The saturated vapor pressure according to kinds of refrigerants is shown in Table 3.

TABLE 3

| Refrigerant Temperature (° C.) | R134a (Mpa) | R410a (Mpa) | R32 (Mpa) |
|---|---|---|---|
| −20 | 0.03 | 0.30 | 0.30 |
| 0 | 0.19 | 0.70 | 0.71 |
| 20 | 1.47 | 1.35 | 1.37 |
| 40 | 0.91 | 2.32 | 1.47 |
| 60 | 1.58 | 3.73 | 3.85 |
| 65 | 1.79 | 4.15 | 4.30 |

Referring to Table 3, when the R410A is used as the refrigerant, a saturated vapor pressure at 65° C. is 4.15, and thus the design pressure P may be determined to 4.15 (MPa).

[Calculation of Minimum Thickness of Ductile Stainless Steel Pipe]

As described above, the allowable stress S is given by ASME SEC. VIII Div. 1, and the design pressure P is determined to 4.15 MPa when the refrigerant is R410a, and the refrigerant temperature is 65° C. A minimum thickness of the pipe, which is calculated according to the outer diameter of the pipe by applying the determined allowable stress S and the design pressure P to Mathematical Equation 1 may be confirmed by the following Table 4.

TABLE 4

| | Minimum Thickness (mm) | | | |
|---|---|---|---|---|
| | Embodiment to which margin is applied | | Calculated Minimum Thickness (R410a) | |
| Outer Diameter of Standard Pipe | (ductile stainless steel pipe) R410a | Comparative Example (copper pipe) | ASME B31.1 ($t_m$) | JIS B 8607 ($t_m - t_{extra}$) |
| φ4.00 | 0.40 | | 0.30 | 0.10 |
| φ4.76 | 0.40 | | 0.32 | 0.12 |
| φ5.00 | 0.40 | | 0.33 | 0.13 |
| φ6.35 | 0.40 | 0.622 | 0.36 | 0.16 |
| φ7.00 | 0.40 | | 0.38 | 0.18 |
| φ7.94 | 0.50 | 0.622 | 0.40 | 0.20 |
| φ9.52 | 0.50 | 0.622 | 0.44 | 0.24 |
| φ12.70 | 0.60 | 0.622 | 0.53 | 0.33 |
| φ15.88 | 0.70 | 0.800 | 0.61 | 0.41 |
| φ19.05 | 0.80 | 0.800 | 0.69 | 0.49 |
| φ22.20 | 1.00 | 1.041 | 0.77 | 0.57 |
| φ25.40 | 1.00 | 1.168 | 0.85 | 0.65 |
| φ28.00 | 1.00 | 1.168 | 0.92 | 0.72 |
| φ31.80 | 1.20 | 1.283 | 1.01 | 0.81 |
| φ34.90 | 1.20 | 1.283 | 1.09 | 0.89 |
| φ38.10 | 1.20 | 1.410 | 1.18 | 0.98 |
| φ41.28 | 1.20 | 1.410 | 1.26 | 1.06 |
| φ50.80 | 1.50 | | 1.50 | 1.30 |
| φ54.00 | 1.50 | 1.623 | 1.58 | 1.38 |

Referring to Table 4, a minimum thickness of the ductile stainless steel pipe derived based on ASME B31.1 and a minimum thickness of the ductile stainless steel pipe derived based on JIS B 8607 may be confirmed. Here, in an embodiment, the ductile stainless steel pipe was used, and in Comparative example, the existing copper pipe was used.

JIS B 8607 is a reference code for a pipe used in Japan. In case of JIS B 8607, a minimum thickness is derived to be less than that in case of ASME B31.1 because the $t_{extra}$ value that is the clearance thickness due to corrosion and the thread working is not considered, unlike ASME B31.1. The $t_{extra}$ value may be set to 0.2 mm in case of copper, a copper alloy, aluminum, an aluminum alloy, and stainless steel.

Although the minimum thickness of the ductile stainless steel pipe according to an embodiment is derived based on ASME B31.1, the minimum thickness may be applicable with a predetermined margin determined between about 0.1 mm to about 0.2 mm in consideration of the pressure when the R401a as the refrigerant. That is, an embodiment is understood that the minimum thickness is suggested with a margin as one example. If the minimum thickness is greater than the calculated minimum thickness, the margin may vary based on the safety factor.

Particularly, in case of the same outer diameter (0.94) in Table 4, it is confirmed that the applicable pipe thickness according to an embodiment is 0.50 mm, and the applicable pipe thickness according to Comparative Example is 0.622 mm. That is, when a pipe designed to have the same outer diameter is provided as the ductile stainless steel pipe described in the embodiment, it means that the thickness of the pipe may be further reduced, and also this means that an inner diameter of the pipe may further increase.

Since the outer diameter of the suction pipe 51 is 22.20 mm, a minimum thickness of the suction pipe 51 is 0.77 mm in the case of ASME B31.1 and 0.57 mm in the case of JIS B 8607. In the case of the embodiment to which a margin is applied, the minimum thickness of the suction pipe 51 may be formed to 1.00 mm.

Thus, a limit thickness value, which is applicable to the suction pipe 51, of the above criteria is 0.57 mm on the basis of JIS B 8607. As a result, the suction pipe 51 may have an inner diameter of 21.06 mm (=22.20−2×0.57) or less.

Also, since the outer diameter of the discharge pipe 52 is 15.88 mm, a minimum thickness of the discharge pipe 52 is 0.61 mm in the case of ASME B31.1 and 0.41 mm in the case of JIS B 8607. In the case of the embodiment to which a margin is applied, the minimum thickness of the discharge pipe 52 may be formed to 0.70 mm.

Thus, a limit thickness value, which is applicable to the discharge pipe 52, of the above criteria is 0.41 mm on the basis of JIS B 8607. As a result, the discharge pipe 52 may have an inner diameter of 15.06 mm (=15.88−2×0.41) or less.

In summary, the outer diameter of the pipe used for the compressor 110 according to the present embodiment may be determined according to the refrigeration capacity of the compressor or the air-conditioning capacity of the air conditioner, and the design pressure may be determined according to the refrigerant used.

When the suction pipe and the discharge pipe are provided as a flexible stainless steel pipe as in the embodiment, the allowable stress of stainless steel is larger than that of copper. Therefore, when this is applied to Equation 1, the thickness of the pipe may be reduced. That is, the allowable stress may be increased by using the ductile stainless steel pipe having relatively high strength or hardness. Accordingly, thickness reduction at the same outer diameter of the pipe may be realized.

Therefore, even when the ductile stainless steel pipe according to the present embodiment is designed to have the same outer diameter as the conventional copper pipe, the inner diameter may be designed to be larger, and thus, the flow resistance of the refrigerant may be reduced and the circulation efficiency of the refrigerant may be improved.

Figure 5:
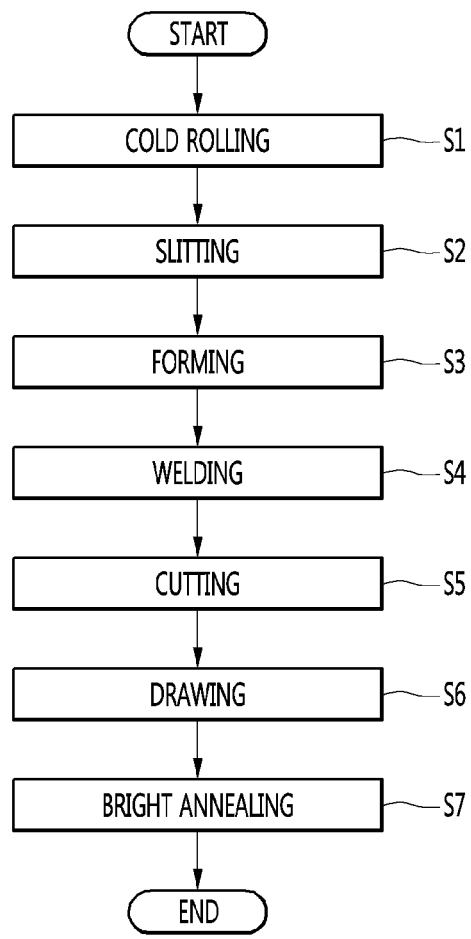
FIG. 5 is a flowchart illustrating a method for manufacturing the ductile stainless steel pipe according to an embodiment.
Figure 6:
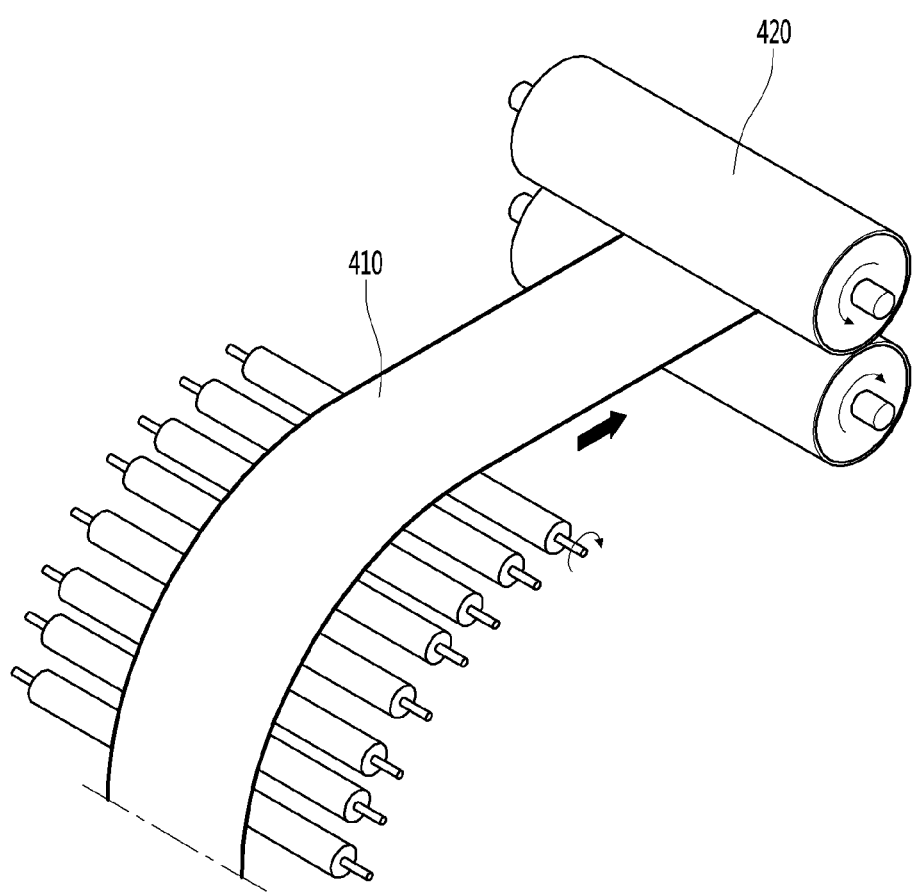
FIG. 6 is a schematic view of a cold rolling process (S1) of FIG. 5.
Figure 7:
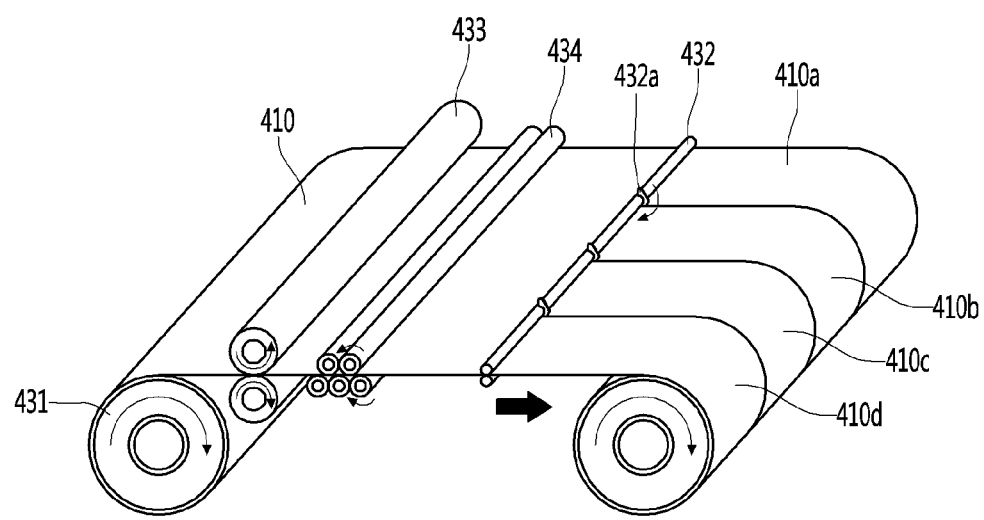
FIG. 7 is a schematic view of a slitting process (S2) of FIG. 5.
Figure 8:
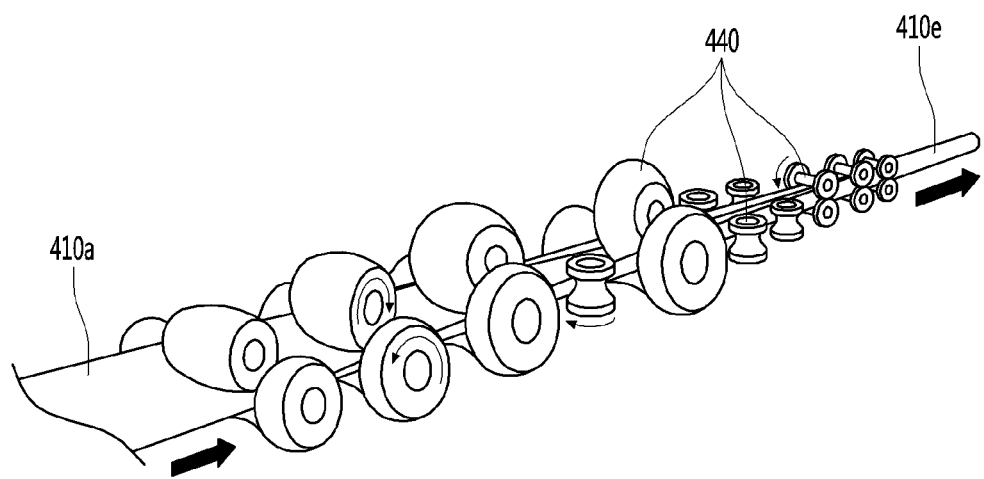
FIG. 8 is a schematic view of a forming process (S3) of FIG. 5.
Figure 11:
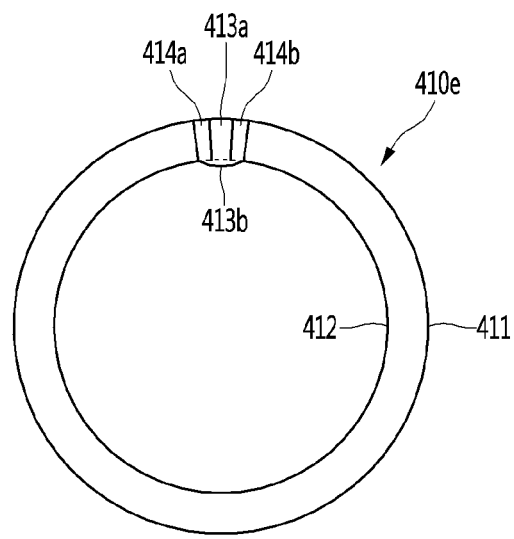
Figure 12:
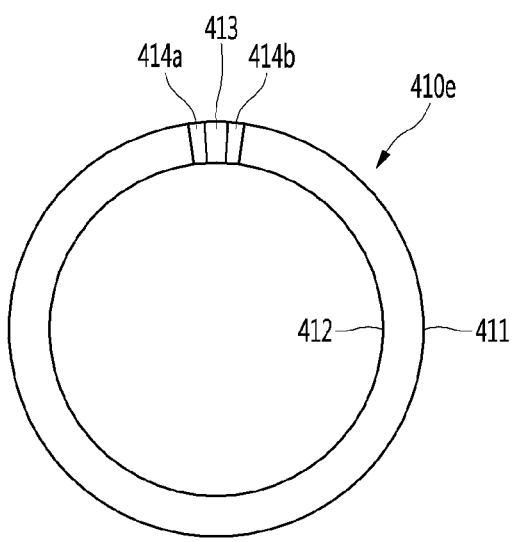
Figure 13:
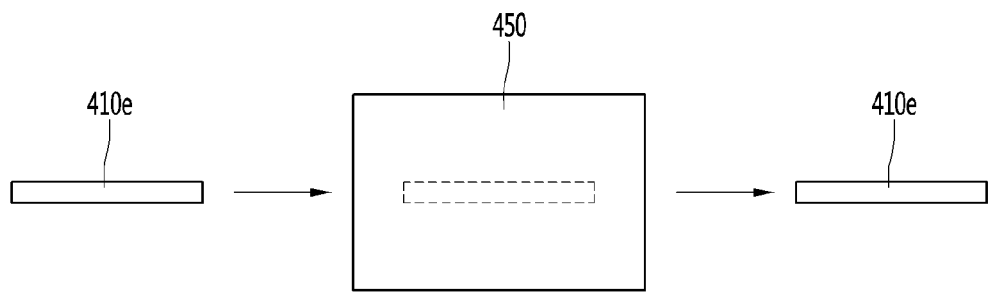
FIG. 13 is a schematic view of a bright annealing process (S7) of FIG. 5.

FIG. 5 is a flowchart illustrating a method for manufacturing the ductile stainless steel pipe according to an embodiment, FIG. 6 is a schematic view of a cold rolling process S1 of FIG. 5, FIG. 7 is a schematic view of a slitting process S2 of FIG. 5, FIG. 8 is a schematic view of a forming process S3 of FIG. 5, FIGS. 9 to 12 are cross-sectional views illustrating a process of manufacturing a ductile stainless steel pipe according to the manufacturing method of FIG. 5, and FIG. 13 is a schematic view of a bright annealing process of FIG. 5.

As described above, since the stainless steel according to the related art has strength and hardness grater than those of copper and thus has a limitation of workability. Particularly, there is a limitation that the stainless steel is limited in bending.

[Required Property of Ductile Stainless Steel Pipe]

To solve these limitations, since the ductile stainless steel pipe according to an embodiment has a composition containing copper, a matrix structure made of austenite, and an average grain size of 30 μm to 60 μm, the ductile stainless steel pipe may have strength and hardness less than those of the stainless steel pipe according to the related art.

Particularly, the austenite has low resistive abdominal strength and low hardness properties when compared to ferrite or martensite. Thus, to manufacture the ductile stainless steel pipe having the properties of the low strength and the low hardness required in this embodiment, it is required to have an austenite matrix structure of 99% or more and a delta ferrite matrix structure of 1% or less on the base of the grain area of the ductile stainless steel pipe.

For this, the ductile stainless steel pipe may have austenite matrix structure of 99% or more and the delta ferrite matrix structure of 1% or less on the base of the grain area of the ductile stainless steel pipe by applying the composition ratio and performing an additional heat treatment.

[Heat Treatment Process of Ductile Stainless Steel Pipe]

A heat treatment process of the ductile stainless steel pipe will be described in detail.

Unlike that the pipe made of copper is manufactured by a single process such as drawing, it is difficult to manufacture the pipe made of the ductile stainless steel through a single process because of having strength and hardness greater than those of copper.

The heat treatment process of the ductile stainless steel pipe according to an embodiment may include a cold rolling process S1, a slitting process S2, a forming process S3, a welding process S4, a cutting process S5, a drawing process S6, and a bright annealing process S7.

[First Process: Cold Rolling Process S1]

The cold rolling process S1 may be understood as a process for rolling the ductile stainless steel provided in the casting process by passing through two rotating rolls at a temperature below a recrystallization temperature. That is, in the cold-rolled ductile stainless steel, unevenness or wrinkles on a surface of a thin film may be corrected, and surface gloss may be given on the surface.

As illustrated in FIG. 6, the ductile stainless steel is provided in the form of a sheet 410, and the sheet 410 is provided to be wound in a coil shape by an uncoiler.

The sheet 410 may receive continuous force by passing between the two rotating rolling rolls 420 disposed in a vertical direction, and thus the sheet 410 may be widened in surface area and thinned in thickness. In this embodiment, the ductile stainless steel is provided in the form of a sheet having a thickness of 1.6 mm to 3 mm in the casting process, and the sheet may be cold-worked to a sheet having a thickness of 1 mm or less through the cold rolling process S1.

[Second Process: Slitting Process S2]

The slitting process S2 may be understood as a process of cutting the cold-worked sheet 410 into a plurality of pieces having a desired width by using a slitter. That is, the single sheet 410 may be cut and worked into a plurality of pieces through the slitting process S2.

As illustrated in FIG. 7, the cold-worked sheet 410 may pass through the slitter 432 while the wound coil is unwound by the rotation of the uncoiler 431 in the state in which the sheet 410 is wound in a coil shape around an outer circumferential surface of the uncoiler 431.

For example, the slitter 432 may include a shaft that is disposed in the vertical direction of the sheet 410 and a rotational cutter 432a coupled to the shaft. The rotational cutter 432a may be provided in plurality, and the plurality of rotational cutters 432 may be spaced apart from each other in a width direction of the sheet 410. Spaced distances between the plurality of rotational cutters 432a may be the same or different from each other in some cases.

Thus, when the sheet 410 passes through the slitter 432, the single sheet 410 may be divided into a plurality of sheets 410a, 410b, 410c, and 410d by the plurality of rotational cutters 432a. In this process, the sheet 410 may have a suitable diameter or width of the refrigerant pipe to be applied. Here, the sheet 410 may be pressed by a plurality of support rollers 433 and 434 arranged in the vertical direction so as to be precisely cut by the slitter 432.

When the slitting process S2 is completed, a bur may be formed on an outer surface of the sheet 410, and the bur needs to be removed. If the bur remains on the outer surface of the sheet 410, welding failure may occur in a process of welding the pipe worked in the form of the sheet 410 to the other pipe, and the refrigerant may leak through a poor welding portion. Accordingly, when the slitting process S2 is completed, a polishing process for removing the bur needs to be additionally performed.

[Third Process: Forming Process S3]

The forming process S3 may be understood as a process of molding the ductile stainless steel in the form of a sheet 410a by passing through multi-staged molding rolls 440 to manufacture the ductile stainless steel in the form of a pipe 410a.

As illustrated in FIG. 8, in the state that the sheet 410a is wound in the form of the coil on the outer circumferential surface of the uncoiler, the coil wound by the rotation of the uncoiler is unwound to enter into the multi-staged forming rolls 440 that alternately disposed in the vertical or horizontal direction. The sheet 410a entering into the multi-staged molding rolls 440 may successively pass through the molding rolls 440 and thus be molded in the form of a pipe 410e of which both ends are adjacent to each other.

Figure 9:
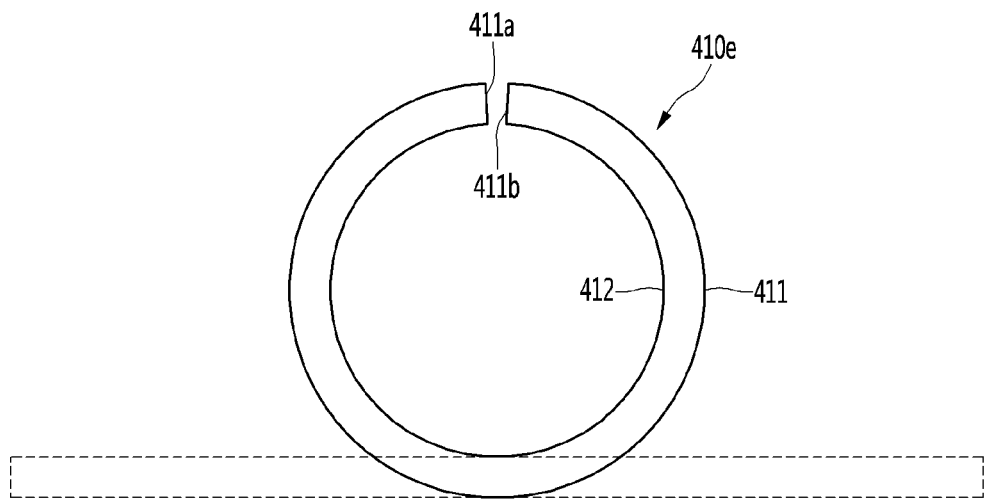
FIGS. 9 to 12 are cross-sectional views illustrating a process of manufacturing a ductile stainless steel pipe according to the manufacturing method of FIG. 5.

FIG. 9 illustrates a shape in which the ductile stainless steel having the sheet shape is rolled and then molded in the form of a pipe 10e. That is, the ductile stainless steel having the form of the sheet 10a may be molded into a pipe 410e, of which both ends 411a and 411b approach each other, through the forming process S3.

[Fourth Process: Welding Process S4]

The welding process S4 may be understood as a process of bonding both the ends 411a and 411b of the pipe 410e, which approach each other by being rolled by the forming process S3, to manufacture a welded pipe. In the welding process S4, the welded pipe may be realized by butt-welding both ends facing each other through a melting welding machine, for example, a general electric resistance welding machine, an argon welding machine, or a high-frequency welding machine.

Figure 10:
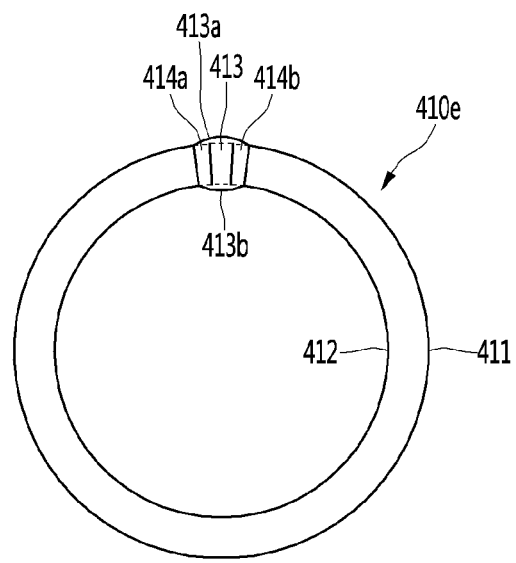

FIG. 10 illustrates a pipe manufactured by rolling and welding a sheet made of ductile stainless steel. Particularly, both the ends 411a and 411b of the pipe 410e may be welded in a longitudinal direction of the pipe 410e to bond both the ends 411a and 411b to each other.

Here, in the welding process, a weld zone 413 is formed in the longitudinal direction of the pipe 410e. As illustrated in FIG. 10, since beads 413a and 413b that slightly protrude from an inner circumferential surface 412 and an outer circumferential surface 411 of the pipe 410e are formed at the weld zone 413, each of the inner circumferential surface 412 and the outer circumferential surface 411 of the pipe 410e does not have a smooth surface.

Heat-affected zones 414a and 414b may be further formed on both sides of the weld zone 413 by heat during the welding process. The heat-affected zones 414a and 414b may also be formed in the longitudinal direction of the pipe 410e, like the weld zone 413.

[Fifth Process: Cutting Process S5]

The cutting process S5 may be understood as a process of partially cutting the bead 413a of the weld zone 413 so that the outer circumferential surface 411 of the pipe 410e has the smooth surface. The cutting process S5 may be continuous with the welding process S4.

For example, the cutting process S5 may include a process of partially cutting the bead 413a using a bite while moving the pipe in the longitudinal direction through press bead rolling.

FIG. 11 illustrates a ductile stainless steel pipe in which the cutting process S5 is finished. That is, the bead 413a formed on the outer circumferential surface 411 of the pipe 410e may be removed through the cutting process S5. In some cases, the cutting process S5 may be performed together with the welding process S4, whereas the cutting process S5 may be omitted.

[Sixth Process: Drawing Process S6]

The drawing process S6 may be understood as a process of applying external force to the bead 413b of the weld zone 413 so that the outer circumferential surface 411 of the pipe 410e has the smooth surface.

For example, the drawing process S6 may be performed by using a drawer including dies having a hole with an inner diameter less than an outer diameter of the pipe 410e manufactured through the forming process S3 and the welding process S4 and a plug having an outer diameter with an outer diameter less than an inner diameter of the pipe 410e manufactured through the forming process S3 and the welding process S4.

Particularly, the pipe 410e in which the welding process S4 and/or the cutting process S5 are performed may pass through the hole formed in the dies and the plug. Here, since the bead 413a formed on the outer circumferential surface 411 of the pipe 410e protrudes outward from a center of the outer circumferential surface 411 of the pipe 410e, the bead 413a may not pass through the hole of the dies and thus be removed while being plastic-deformed.

Similarly, since the bead 413b formed on the inner circumferential surface 412 of the pipe 410e protrudes toward the center of the inner circumferential surface 412 of the pipe 410e, the bead 413b may not pass through the plug and thus be removed while being plastic-deformed.

That is, as described above, the welded beads 413a and 413b formed on the inner circumferential surface 412 and the outer circumferential surface 411 of the pipe 410e may be removed through the drawing process S6. Also, since the welded bead 413a on the inner circumferential surface 412 of the pipe 410e is removed, it is possible to prevent a protrusion from being formed on the inner circumferential surface 412 of the pipe 410e when the pipe 410e is expanded for the refrigerant pipe.

FIG. 12 illustrates a ductile stainless steel pipe in which the drawing process S6 is finished. That is, the beads 413a and 413b formed on the inner and outer circumferential surfaces 412 and 411 of the pipe 410e may be removed through the drawing process S6.

The reason for forming the outer and inner circumferential surfaces 411 and 412, which have the smooth surfaces, of the pipe 410e is for forming the uniform inner diameter of the pipe 410e and easily connecting the pipe to the other pipe. Also, the reason for forming the uniform inner diameter in the pipe 410e is for maintaining a smooth flow of the refrigerant and a constant pressure of the refrigerant. Although not shown, after the drawing process S6, a groove (not shown) may be formed on the outer and inner circumferential surfaces 411 and 412 of the pipe 410e through mechanical working.

[Seventh Process: Bright Annealing Process S7]

The bright annealing process S7 may be understood as a process for heating the pipe 410e from which the welded beads are removed to remove heat history and residual stress remaining in the pipe 410e. In this embodiment, the austenite matrix structure of 99% or more and the delta ferrite matrix structure of 1% or less are formed based on the grain area of the ductile stainless steel, and also, to increase the average grain size of the ductile stainless steel to 30 μm to 60 μm, the heat treatment process is performed.

Particularly, the average grain diameter (or the grain size number) of the ductile stainless steel is a key factor in determining the low strength and low hardness properties of the stainless steel. Particularly, the bright annealing process S7 is performed by annealing the pipe 410e, from which the welded beads are removed, in a stream of a reducing or non-oxidizing gas and cooling the annealed pipe 410e as it is after the annealing.

As illustrated in FIG. 13, the pipe 410e from which the welded beads are removed passes through an annealing furnace 450 at a constant speed. The inside of the annealing furnace 450 may be filled with an atmospheric gas, and also, the inside of the annealing furnace 450 may be heated at a high temperature by using an electric heater or a gas burner.

That is, the pipe 410 may receive a predetermined heat input while passing through the annealing furnace 450. Accordingly, the ductile stainless steel may have the austenite matrix structure and the average grain size of 30 μm to 60 μm due to the heat input.

The heat input represents a heat amount entering into a metal member. Also, the heat input plays a very important role in metallographic microstructure control. Thus, in this embodiment, a heat treatment method for controlling the heat input is proposed.

In the bright annealing process S7, the heat input may be determined according to a heat treatment temperature, an atmospheric gas, or a transfer speed of the pipe 410e.

In case of the bright annealing process S7 according to this embodiment, the heat treatment temperature is 1,050° C. to 1,100° C., the atmospheric gas is hydrogen or nitrogen, and the transfer speed of the pipe 410e is 180 mm/min to 220 mm/min. Thus, the pipe 410e may pass through the annealing furnace 450 at a transfer speed of 180 mm/min to 220 mm/min at an annealing heat treatment temperature of 1,050° C. to 1,100° C. in the annealing furnace 450.

Here, if the annealing heat treatment temperature is less than 1,050° C., sufficient recrystallization of the ductile stainless steel does not occur, the fine grain structure is not obtained, and the flattened worked structure of the grain is generated to reduce creep strength. On the other hand, if the annealing temperature exceeds 1,100° C., high-temperature intercrystalline cracking or ductility deterioration may occur.

Also, when the pipe 410e from which the welded beads are removed passes through the annealing furnace 450 at a transfer speed of less than 180 mm/min, the productivity is deteriorated due to a long time. On the other hand, when the pipe 410e passes through the annealing furnace 450 at a transfer speed exceeding 52 mm/min, the stress existing in the ductile stainless steel is not sufficiently removed, and also the average grain size of the austenite matrix structure is less than 30 μm. That is, if the transfer speed of the pipe 410e is too high, the average grain size of the ductile stainless steel is less than 30 μm, and the low strength and low hardness properties required in the this embodiment may not be obtained.

As described above, the ductile stainless steel pipe according to an embodiment, which is manufactured through the cold rolling process S1, the slitting process S2, the forming process S3, the welding process S4, the cutting process S5, the drawing process S6, and the bright annealing process S7 may be temporarily stored in a coiled state by a spool or the like and then be shipped.

Although not shown, after the bright annealing process S7 is completed, shape correction and surface polishing processing may be further performed.

<Fatigue Failure Test>

Figure 14:
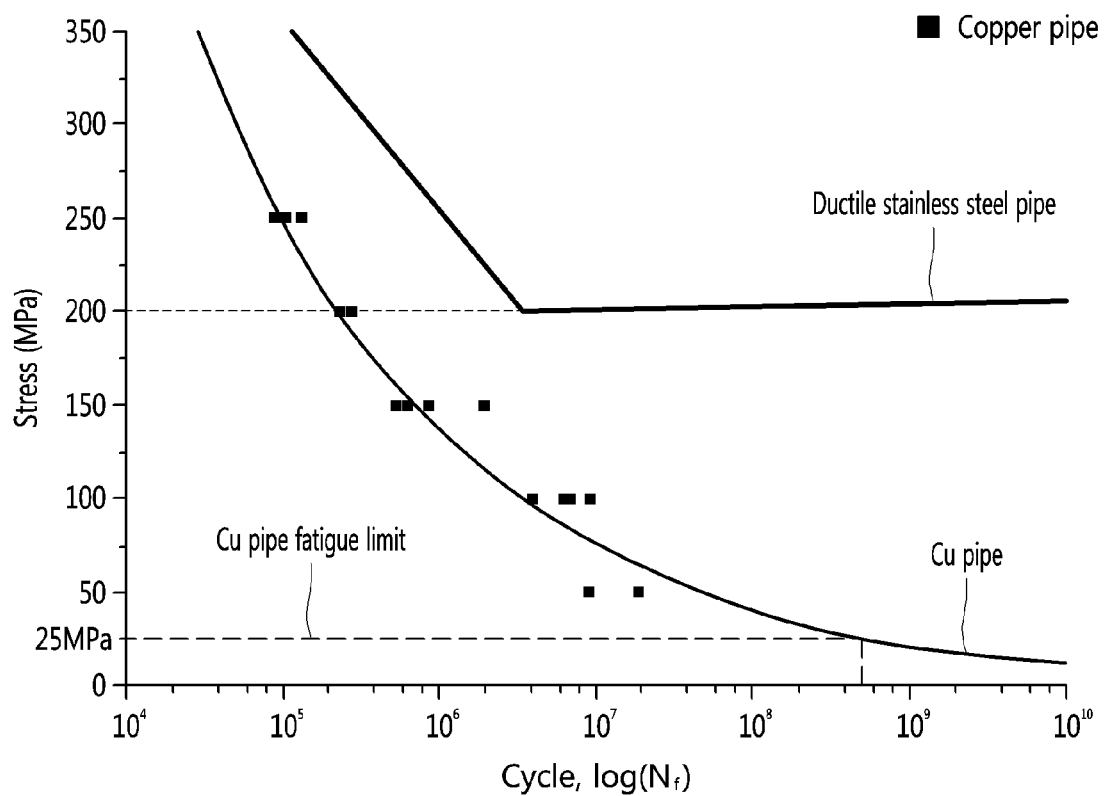
FIG. 14 is a graph illustrating result values obtained through an S-N curve test for comparing fatigue limits of the ductile stainless steel pipe according to an embodiment and a copper pipe according to the related art.
Figure 15:
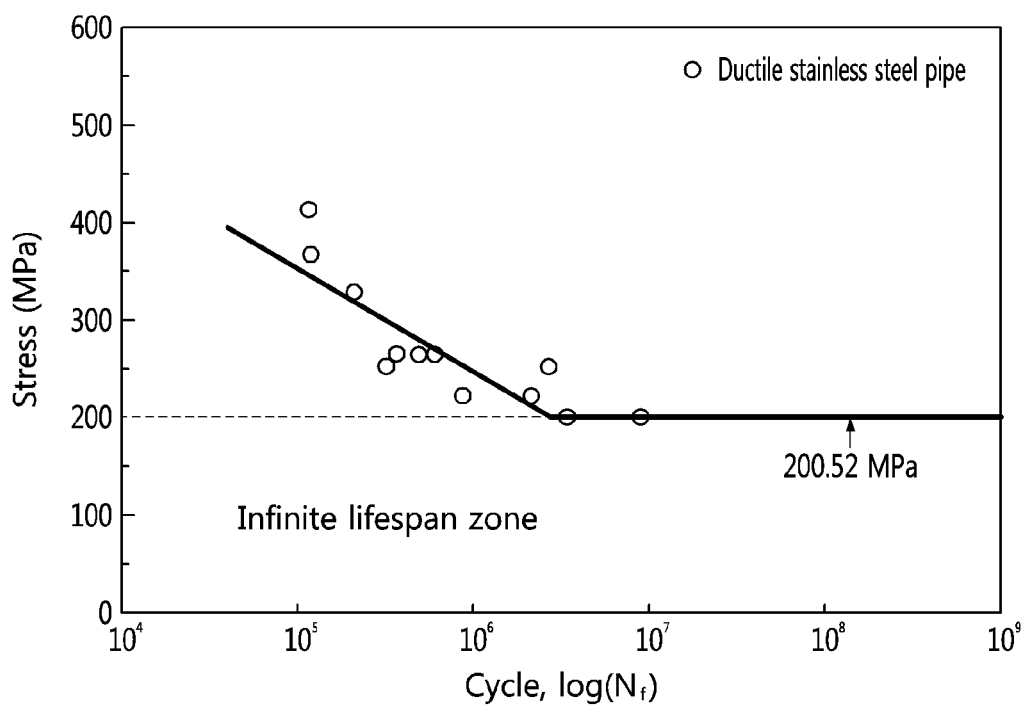
FIG. 15 is a graph illustrating an S-N curve teat of the ductile stainless steel pipe according to an embodiment.

FIG. 14 is a graph illustrating result values obtained through an S-N curve test for comparing fatigue limits of the ductile stainless steel pipe according to an embodiment and a copper pipe according to the related art, and FIG. 15 is a graph illustrating an S-N curve teat of the ductile stainless steel pipe according to an embodiment.

Referring to FIGS. 14 and 15, the ductile stainless steel pipe according to an embodiment has a fatigue limit (or endurance limit) of about 200.52 MPa. This is a value greater by about 175 MPa (8 times) than the copper pipe according to the related art having a fatigue limit of 25 MPa. That is, the ductile stainless steel pipe may have improved durability, reliability, life expectancy, and freedom in design when compared to the copper pipe according to the related art. Hereinafter, effects of the ductile stainless steel pipe will be described in more detail.

[Maximum Allowable Stress]

The ductile stainless steel pipe may be determined in maximum allowable stress value on the basis of the fatigue limit value. For example, the maximum allowable stress of the ductile stainless steel pipe may be set to 200 MPa when the air conditioner is started or stopped and may be set to about 90 MPa when the air conditioner is in operation. The reason in which the maximum allowable stress has a small value during the operation of the air conditioner may be understood as reflecting the stress due to the refrigerant flowing in the pipe in the operation state.

The maximum allowable stress represents a maximum stress limit that may be allowed to safely use a pipe or the like. For example, the pipe and the like may receive external force during use, and stress may be generated in the pipe due to the external force. Here, when the internal stress is equal to or greater than a certain critical stress value determined by a factor such as a solid material, the pipe may be permanently deformed or broken. Therefore, the maximum allowable stress may be set to safely use the pipe.

[Fatigue Limit]

When repeated stress is applied continuously to a solid material such as steel, the solid material may be broken at stress much lower than tensile strength. This is called fatigue of the material, and a failure due to the fatigue is called fatigue failure. The fatigue of the material occurs when the material undergoes a repeated load. Also, the material may be broken eventually when beyond a certain limit due to the repeated load. Here, an endurance limit in which the material is not broken even under repeated load is defined as a fatigue limit endurance limit.

[Relationship Between Fatigue Limit and S-N Curve]

An S-N curve shows the number of repetitions (N, cycles) until certain stress is repeated. In detail, the solid material is destroyed more quickly if it is subjected to repeated stress several times, and the number of repetitions of stress till the failure is affected by the amplitude of the applied stress. Thus, effects due to the degree of stress and the number of repetitions of stress until the solid material is broken may be analyzed through the S-N curve.

In the S-N curve test graph of FIGS. 14 and 15, a vertical axis represents a stress amplitude (Stress), and a horizontal axis represents a log value of the repetition number. Also, the S-N curve is a curve drawn along the log value of the number of repetitions until the material is destroyed when the stress amplitude is applied. In general, the S-N curve of the metal material increases as the stress amplitude decreases, the number of repetitions till the fracture increases. Also, when the stress amplitude is below a certain value, it is not destroyed even if it repeats infinitely. Here, the stress value at which the S-N curve becomes horizontal represents the fatigue limit or endurance limit of the above-mentioned material.

[Fatigue Limit Limitation of Copper Pipe]

In the S-N curve of the copper pipe according to the related art, which is based on fatigue failure test data of the copper pipe of FIG. 14 according to the related art, it is seen that the fatigue limit of the copper pipe according to the related art is about 25 MPa. That is, maximum allowable stress of the copper pipe is 25 MPa. However, a case in which the stress of the pipe has a value of about 25 Mpa to about 30 MPa when the air conditioner is started or stopped may occur according to an operation state or condition of the air conditioner. As a result, the copper pipe according to the related art has a limitation that the lifetime of the pipe is shortened, and the durability is deteriorated due to the stress value exceeding the degree of fatigue as described above.

[Effect of Ductile Stainless Steel Pipe]

Referring to FIGS. 14 and 15, in the SN curve according to this embodiment, which is based on the fatigue failure test data of the ductile stainless steel pipe, the fatigue limit of the ductile stainless steel pipe is about 200.52 MPa, which is greater 8 times than that of the copper stainless steel pipe. That is, maximum allowable stress of the ductile stainless steel pipe is about 200 MPa. The stress in the pipe provided in the air conditioner does not exceed the maximum allowable stress of the ductile stainless steel pipe even when considering the maximum operation load of the air conditioner 10. Accordingly, when the ductile stainless steel pipe is used in an air conditioner 10, the lifespan of the pipe may be prolonged, and the durability and the reliability may be improved.

The ductile stainless steel pipe has a design margin of about 175 MPa when compared to the fatigue limit of the copper pipe. In detail, the outer diameter of the ductile stainless steel pipe is the same as the outer diameter of the copper pipe according to the related art, and the inner diameter may be expanded.

That is, a minimum thickness of the ductile stainless steel pipe may be less than that of the copper pipe, and even in this case, maximum allowable stress may be greater than that of the copper pipe due to the relatively high design margin. As a result, there is an effect that the degree of freedom in designing the ductile stainless steel pipe is improved.

<Stress Measurement Test>

Stress more than the fatigue limit of the copper pipe according to the related art may be generated in the pipe according to the operation conditions of the air conditioner. On the other hand, when the ductile stainless steel pipe is used in an air conditioner, the maximum stress value generated in the ductile stainless steel pipe does not reach the fatigue limit of the ductile stainless steel pipe. Hereinafter, this will be described in detail.

<Improvement of Performance (COP)>

FIG. 16 is a graph illustrating result values obtained through a test for comparing pressure losses within the pipes when each of the ductile stainless steel pipe according to an embodiment and the copper pipe according to the related art is used as a gas pipe, and FIG. 17 is a test result table illustrating performance of the ductile stainless steel pipe according to an embodiment and the copper pipe according to the related art.

The gas pipe may be understood as a pipe for guiding a flow of an evaporated low-pressure gas refrigerant or a compressed high-pressure gas refrigerant on the basis of the refrigerant cycle.

In more detail, FIGS. 16(a) and 17(a) are test graphs in the standard pipe (5 m), and FIGS. 16(b) and 17(b) are test graphs in the long pipe (50 m).

[Comparison of Pressure Loss in Pipe]

Referring to FIGS. 16(a) and 16(b), a vertical axis of the graph represents a pressure change amount or a pressure loss amount ($\Delta P$=Pin-Pout, Unit KPa) in the gas pipe, and a horizontal axis represents the cooling mode or the heating mode of the air conditioner.

As described above, the ductile stainless steel pipe according to an embodiment is significantly improved in durability and degree of design freedom when compared to the copper pipe according to the related art. Therefore, the ductile stainless steel pipe has the same outer diameter as the copper pipe and may have an inner diameter expanded more than the copper pipe. The ductile stainless steel pipe may decrease in flow resistance and increase in flow rate of the refrigerant when compared to the copper pipe due to the expanded inner diameter. Also, the ductile stainless steel pipe may be reduced in pressure loss in the pipe when compared to the copper pipe according to the related art.

[Comparison of Pressure Loss in Standard Pipe]

Referring to FIG. 16(a), the pressure loss with the pipe of the gas pipe is formed so that the pressure loss of the ductile stainless steel pipe is less by about 2.3 KPa than that of the copper pipe according to the related art with respect to the standard pipe having a length of about 5 m. In detail, in the cooling mode, a pressure loss ($\Delta P$) of the ductile stainless steel pipe is about 6.55 KPa, and a pressure loss ($\Delta P$) of the copper pipe is about 8.85 KPa. That is, in the cooling mode of the standard pipe (5 m), the pressure loss of the ductile stainless steel pipe is less by about 26% than that of the copper pipe.

Also, the pressure loss ($\Delta P$) of the ductile stainless steel pipe is less by about 1.2 KPa than that ($\Delta P$) of the copper pipe according to the related art in the heating mode of the standard pipe (5 m). That is, in the heating mode, a pressure loss ($\Delta P$) of the ductile stainless steel pipe is about 3.09 KPa, and a pressure loss ($\Delta P$) of the copper pipe is about 4.29 KPa. That is, in the heating mode of the standard pipe (5 m), the pressure loss of the ductile stainless steel pipe is less by about 28% than that of the copper pipe.

[Comparison of Pressure Loss in Long Pipe]

Referring to FIG. 16(b), the pressure loss with the pipe of the gas pipe is formed so that the pressure loss of the ductile stainless steel pipe is less by about 16.9 KPa than that of the copper pipe according to the related art with respect to the long pipe having a length of about 50 m. That is, in the cooling mode, a pressure loss ($\Delta P$) of the ductile stainless steel pipe is about 50.7 KPa, and a pressure loss ($\Delta P$) of the copper pipe is about 67.6 KPa. That is, in the cooling mode of the long pipe (50 m), the pressure loss of the ductile stainless steel pipe is less by about 26% than that of the copper pipe.

Also, the pressure loss ($\Delta P$) of the ductile stainless steel pipe is less by about 10.2 KPa than that ($\Delta P$) of the copper pipe according to the related art in the heating mode of the long pipe (50 m). That is, in the heating mode, a pressure loss ($\Delta P$) of the ductile stainless steel pipe is about 29.03 KPa, and a pressure loss ($\Delta P$) of the copper pipe is about 39.23 KPa. That is, in the heating mode of the long pipe (50 m), the pressure loss of the ductile stainless steel pipe is less by about 26% than that of the copper pipe.

[Coefficient of Performance]

A refrigerant pressure loss may occur in the gas pipe and the suction pipe 51 or the discharge pipe 52 of the compressors 110 and 112. The refrigerant pressure loss causes an adverse effect such as decrease in refrigerant circulation amount, decrease in volume efficiency, increase in compressor discharge gas temperature, increase in power per unit refrigeration capacity, and decrease in coefficient of performance (COP).

Therefore, as illustrated in FIG. 16, when the gas pipe, the suction pipe, or the discharge pipe is provided as the ductile stainless steel pipe, the pressure loss in the pipe may be reduced when compared to the copper pipe according to the related art, a compressor work of the compressor (e.g., power consumption (kW)) may decrease, and the coefficient of performance (COP) may increase.

[Comparison of Coefficient of Performance in Standard Pipe]

Referring to FIG. 17(a), the cooling capacity is about 9.36 kW for the copper pipe and about 9.45 kW for the ductile stainless steel pipe in the cooling mode of the standard pipe (5 m). That is, the heat quantity Q of the ductile stainless steel pipe is greater by about 100.9% than that of the copper pipe. Also, the power consumption is about 2.07 kW for the copper pipe and about 2.06 kW for the ductile stainless steel pipe. Therefore, since the COP is about 4.53 in the copper pipe and about 4.58 in the ductile stainless steel pipe, the ductile stainless steel pipe is improved to about 100.9% of the copper pipe according to the related art.

Also, in the heating mode of the standard pipe (5 m), the heating capacity is about 11.28 kW for the copper pipe and about 11.31 kW for the ductile stainless steel pipe. That is, the heat quantity Q of the ductile stainless steel pipe is greater by about 100.2% than that of the copper pipe. Also, the power consumption is about 2.55 kW for the copper pipe and about 2.55 kW for the ductile stainless steel pipe. Therefore, since the COP is 4.43 in the copper pipe and 4.44 in the ductile stainless steel pipe, the ductile stainless steel pipe is improved to about 100.2% of the copper pipe according to the related art.

[Comparison of Coefficient of Performance in Long Pipe]

The improvement of the efficiency (performance coefficient) due to the reduction of the pressure loss on the pipe is more evident in the pipe (50 m) than the standard pipe (5 m). That is, as the length of the pipe becomes longer, the performance of the ductile stainless steel pipe improved when compared to the copper pipe according to the related art may be further improved.

Referring to FIG. 17(b), the cooling capacity is about 7.77 kW for the copper pipe and about 8.03 kW for the ductile stainless steel pipe in the cooling mode of the long pipe (5 m). That is, the heat quantity Q of the ductile stainless steel pipe is greater by about 103.4% than that of the copper pipe. Also, the power consumption is about 2.08 kW for the copper pipe and about 2.08 kW for the ductile stainless steel pipe. Therefore, since the COP is 3.74 in the copper pipe and 3.86 in the ductile stainless steel pipe, the ductile stainless steel pipe is improved to about 103.2% of the copper pipe according to the related art.

Also, in the heating mode of the long pipe (50 m), the heating capacity is about 8.92 kW for the copper pipe and about 9.07 kW for the ductile stainless steel pipe. That is, the heat quantity Q of the ductile stainless steel pipe is greater by about 101.7% than that of the copper pipe. Also, the power consumption is about 2.54 kW for the copper pipe and about 2.53 kW for the ductile stainless steel pipe. Therefore, since the COP is 3.51 in the copper pipe and 3.58 in the ductile stainless steel pipe, the ductile stainless steel pipe is improved to about 102% of the copper pipe according to the related art.

<Corrosion Resistance Test>

Figures 18, 19:
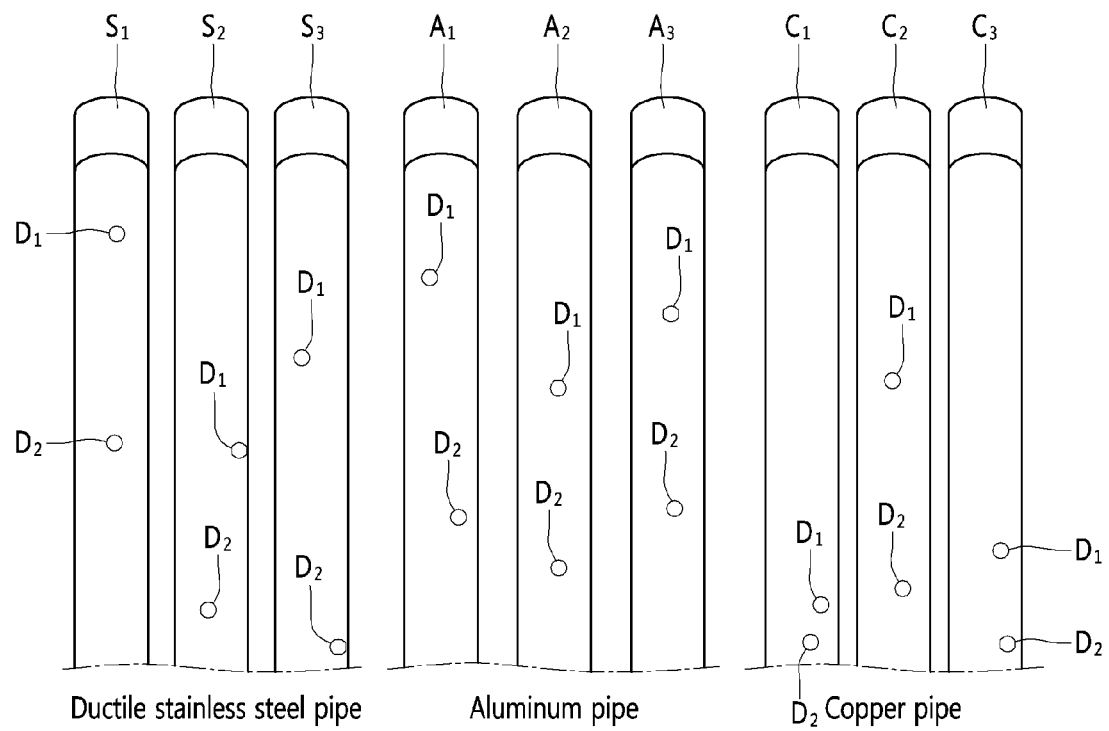
FIG. 18 is a view illustrating a plurality of ductile stainless steel pipes, aluminum (Al) pipes, and copper pipes, which are objects to be tested for corrosion resistance.
FIG. 19 is a table illustrating results obtained by measuring a corrosion depth for each pipe in FIG. 18.
Figure 20:
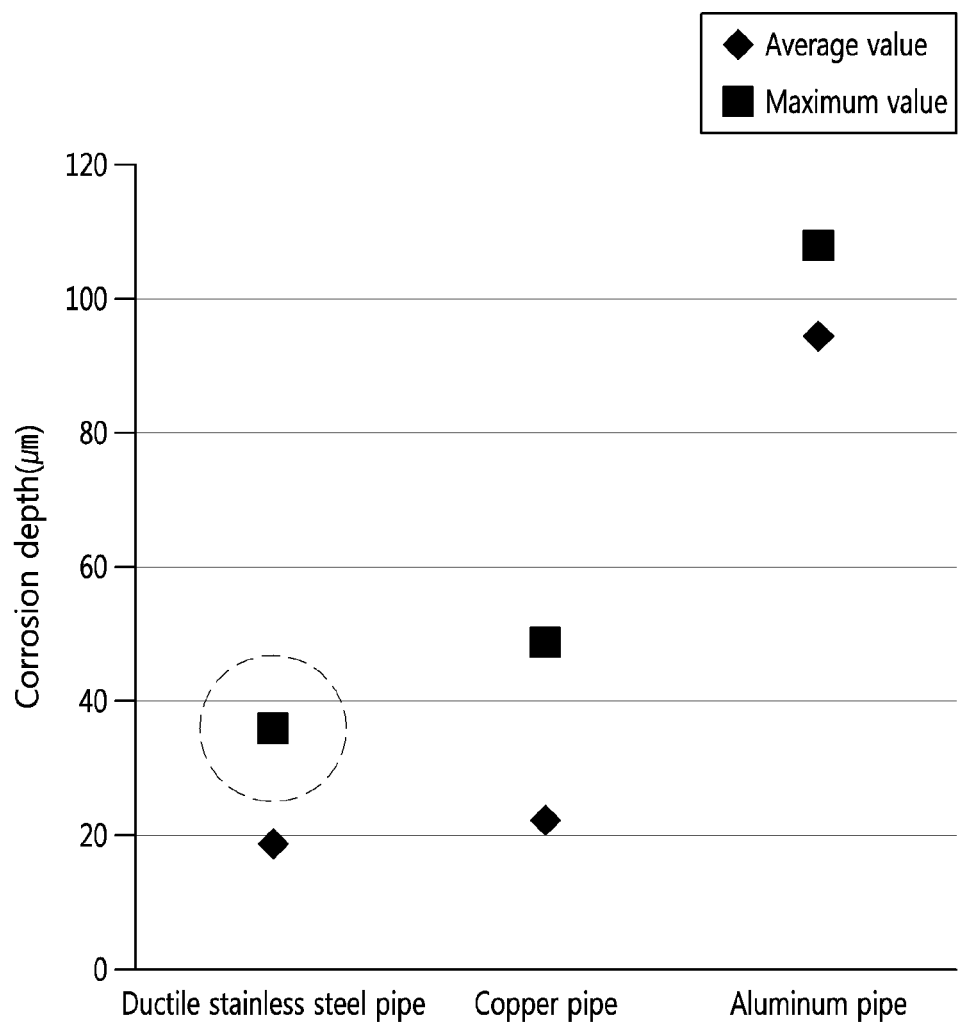
FIG. 20 is a graph illustrating results of FIG. 19.

FIG. 18 is a view illustrating a plurality of ductile stainless steel pipes, aluminum (Al) pipes, and copper pipes, which are objects to be tested for corrosion resistance, FIG. 19 is a table illustrating results obtained by measuring a corrosion depth for each pipe in FIG. 18, and FIG. 20 is a graph illustrating results of FIG. 19.

Corrosion resistance represents a property of a material to withstand corrosion and erosion. It is also called corrosion resistance. In general, stainless steel or titanium is more corrosion resistant than carbon steel because it is not well corroded. The corrosion resistance test includes a salt water spray test and a gas test. The resistance of the product to the atmosphere including the salt may be determined through the corrosion resistance test to examine the heat resistance, the quality and uniformity of the protective coating.

[Complex Corrosion Test]

Referring to FIGS. 18 to 20, when the cyclic corrosion test is performed on the ductile stainless steel pipe according to an embodiment together with comparative groups (Al, Cu) of the other pipe, it is confirmed that the corrosion resistance is the most excellent because the corrosion depth (μm) is the smallest value in comparison with the comparative group. Hereinafter, this will be described in detail.

The cyclic corrosion test represents a corrosion test method in which atmospheres of salt spraying, drying and wetting are repeatedly performed for the purpose of approaching or promoting the natural environment. For example, evaluation may be carried out by setting the test time to be 30 cycles, 60 cycles, 90 cycles, 180 cycles, and the like, with 8 hours of one cycle, 2 hours of spraying with salt, 4 hours of drying, and 2 hours of wetting. The salt spraying test during the complex corrosion test is the most widely used as an accelerated test method for examining the corrosion resistance of plating and is a test for exposing a sample in the spray of saline to examine the corrosion resistance.

Referring to FIG. 18, a plurality of ductile stainless steel pipes S1, S2, and S3, a plurality of aluminum pipes A1, A2, and A3, and a plurality of copper pipes C1, C2, and C3 in which the complex corrosion test is performed, are illustrated, and the corrosion depth (μm) was measured by defining arbitrary positions D1 and D2 in each pipe.

[Test Result and Advantages of Ductile Stainless Steel Pipe]

Referring to FIGS. 19 and 20, the pip measured to have the deepest corrosion depth is the aluminum pipe having an average of 95 μm. Next, the average copper pipe is about 22 μm, and the ductile stainless steel pipe has an average value of 19 μm, which is the most corrosion-resistant measurement value. Also, the maximum value Max of the corrosion depth μm is the deepest of aluminum pipe to about 110 μm, followed by copper pipe to 49 μm, and the soft stainless steel pipe to 36 μm.

Attempts have been made to use the aluminum pipe to replace the copper pipe according to the related art. However, since the corrosion resistance is low as in the above-mentioned test results, there is a great disadvantage that the corrosion resistance is lowest. On the other hand, the ductile stainless steel pipe has the most excellent corrosion resistance and is superior in durability and performance to the pipe according to the related art.

<Bending Test>

In the case of installing an air conditioner by connecting pipes to each other according to individual installation environments, the pipe is not only a straight pipe, but also a bent pipe formed by bending external force of a worker installing the pipe. Also, the straight pipe or the bent pipe connects the outdoor unit to the indoor unit.

The stainless steel pipe according to the related art has strength grater than that of the copper pipe. Therefore, due to the high strength of the stainless steel pipe according to the related art, it is very difficult for an operator to apply external force to the pipe to form a bent pipe. Therefore, there has been a limitation that the copper pipe or the aluminum pipe has to be used for the convenience of installation work.

However, the strength of the ductile stainless steel pipe according to an embodiment may be lower than that of the stainless steel pipe according to the related art and may be lowered to a level higher than that of the copper pipe according to the related art. Thus, since the above-mentioned bent pipe or the like may be formed, the low moldability of the stainless steel pipe according to the related art may be solved. Hereinafter, the bending test will be described below in detail.

[Shape of Bent Pipe and Curvature Radius]

Figure 22:
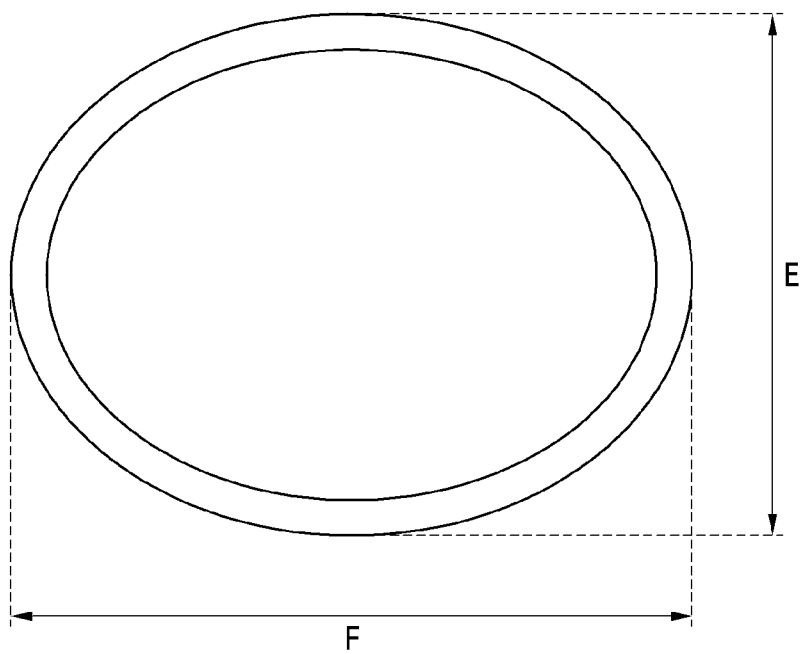
FIG. 22 is a cross-sectional view illustrating a portion of the bent pipe.
Figure 23:
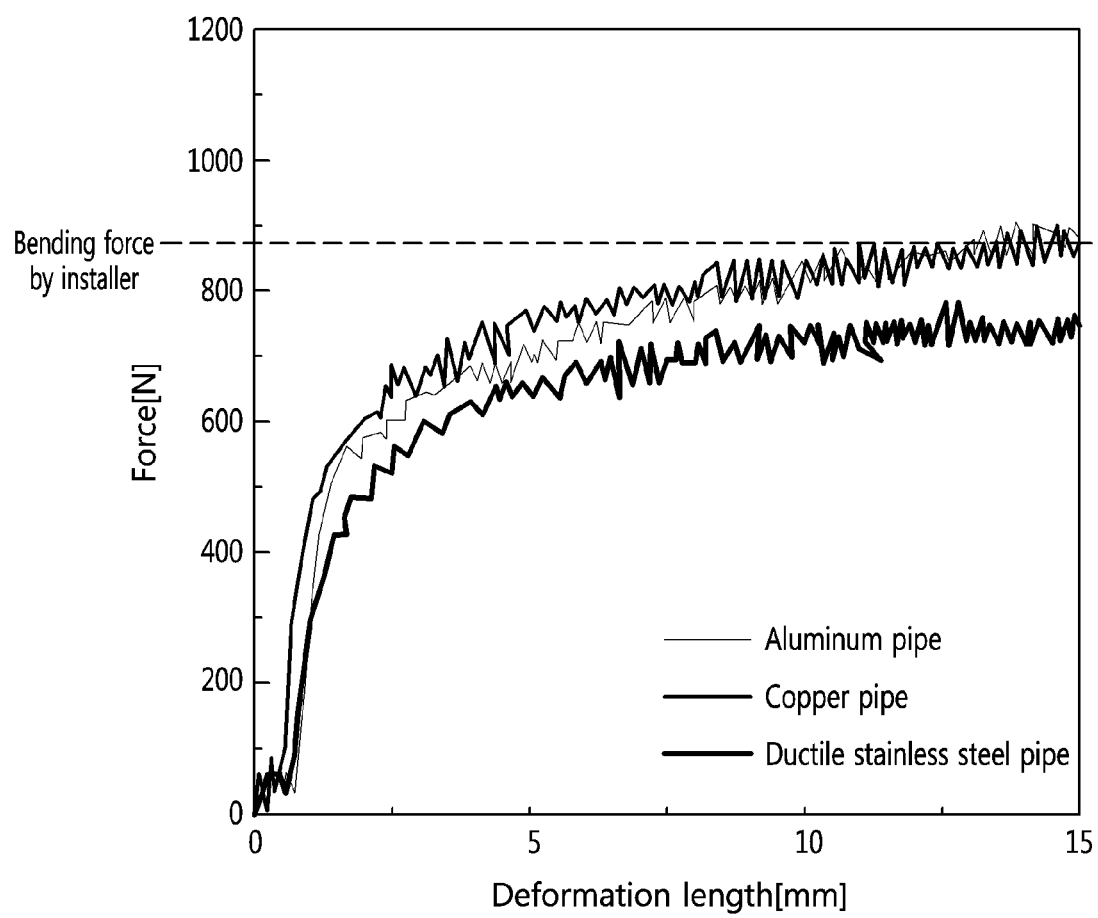
FIG. 23 is a graph illustrating results obtained through a test for comparing bending loads according to deformation lengths of the ductile stainless steel pipe, the copper pipe, and the aluminum pipe.

FIG. 21 is view illustrating a shape in which the ductile stainless steel pipe is bent according to an embodiment, FIG. 22 is a cross-sectional view illustrating a portion of the bent pipe, and FIG. 23 is a graph illustrating results obtained through a test for comparing bending loads according to deformation lengths of the ductile stainless steel pipe, the copper pipe, and the aluminum pipe.

Referring to FIG. 21, the ductile stainless steel pipe according to an embodiment may be bent by bending force. For example, the ductile stainless steel pipe may have an L-shape as illustrated in FIG. 21(a) or an S-shape as illustrated in FIG. 21(b).

Referring to FIGS. 21(a) and 21(b), a central line of the ductile stainless steel pipe may include a curved portion having a curvature so as to be bent in the other direction in one direction. Also, the curve has a curvature radius R.

The curvature radius R is defined as a value indicating a degree of curvature at each point of the curve. The curvature radius R of the ductile stainless steel pipe forming the curved line may include a minimum curvature radius Rmin that may be used in a pipe which does not generate wrinkles even when the straight pipe is formed into a curved line and does not generate vibration. Also, the minimum curvature radius Rmin may be measured in a bent pipe that meets a setting criterion for a ratio of maximum and minimum outside diameters.

[Ratio of Maximum/Minimum Outer Diameters of Ductile Stainless Steel Pipe]

Referring to FIG. 22, the ductile stainless steel pipe may be provided as a bent pipe so that a ratio (E/F) of a maximum outer diameter (F) to a minimum outer diameter (E) is more than 0.85 and less than 1.

The ratio of the maximum and minimum outside diameters (E/F) is a conservatively estimated standard based on the standards of ASME (American Society of Mechanical Engineers) and JIS (Japanese Industrial Standards) (see Table 7).

Table 5 below shows setting criteria for the ratio of the maximum and minimum diameters.

TABLE 5

| ASME | (F-E) < 0.08*D |
|---|---|
| JIS | When R > 4D, E > (2/3)*D |
| Setting Criteria | (E/F) > 0.85 |

In Table 5, D represents a value of the straight pipe (a reference pipe), and R represents a curvature radius.

[Comparison of Bending Property of Ductile Stainless Steel Pipe, Copper Pipe, and Aluminum Pipe]

FIG. 23 illustrates results of testing the bending properties of the ductile stainless steel pipe satisfying the setting criteria (ratio of maximum and minimum outside diameters). In the bending property test, the ductile stainless steel pipe has a diameter Φ of 15.88 mm.

The bending represents bending downward or upward in a state in which the beam is bent when a load is applied. When the beam is bent downward, tensile force acts on the bottom portion, and when the beam is bent upward, compressive force acts on the bottom portion.

Referring to FIG. 23, force N applied to the aluminum pipe, the copper pipe, and the ductile stainless steel pipe according to the deformation length (mm), each of which has a pipe diameter Φ of 15.88 mm is illustrated.

When the minimum curvature radius Rmin is measured at the pipe having a diameter Φ of 15.88 mm, the copper pipe has a diameter of 85 mm, and the ductile stainless steel pipe has a diameter of 70 mm. Accordingly, since the ductile stainless steel pipe has a curvature radius R less than that of the copper pipe, it may be bent to be equal to or higher than that of the copper pipe.

Thus, since the ductile stainless steel pipe forms the curved pipe at a level equivalent to that of the copper pipe, the moldability may be improved when compared to the stainless steel pipe according to the related art. Here, the bending force of the worker is assumed to the maximum bending load of the copper pipe and the aluminum pipe. In this embodiment, the bending force of the worker may be 900 N.

In the graph of the bending property test result, the force N applied in the section of 0 mm to 2.5 mm of the deformation length may sharply increase, and then the force at the deformation length may gradually decrease in inclination to approach the maximum force N.

Also, in the graph of the bending property test result, the maximum bending load of the flexible stainless steel pipe may be 750 N, and the maximum bending load of each of the copper pipe and the aluminum pipe may be 900 N. That is, the maximum bending load of the ductile stainless steel pipe is less than that of the pipe according to the related art.

Therefore, the worker may form the ductile stainless steel pipe to be bent by using force within 83% of the maximum bending load of each of the copper pipe and the aluminum pipe. As a result, the worker may form the ductile stainless steel pipe to be bent by applying force less than that applied to form the copper pipe and the aluminum pipe to be bent.

In summary, the ductile stainless steel pipe according to an embodiment has an effect of improving the moldability when compared to the stainless steel pipe, the copper pipe and the aluminum pipe according to the related art. Therefore, the easy in the installation may be improved.

The invention claimed is:

1. An air conditioner comprising:
   an outdoor unit comprising a compressor, an outdoor heat exchanger, and a main expansion device, wherein a refrigerant is circulated by a refrigerant pipe configured to connect the compressor, the outdoor heat exchanger, and the main expansion device,
   an indoor unit comprising an indoor heat exchanger; and
   a connection pipe configured to connect the outdoor unit and the indoor unit,
   wherein the air conditioner has a cooling capability between 23 kW and 35 kW,
   wherein a mixed refrigerant containing R32 of 50% or more is used as the refrigerant, and
   wherein the refrigerant pipe comprises a ductile stainless steel pipe having a delta ferrite matrix structure of 1% or less on a basis of a grain area,
   wherein the ductile stainless steel material comprises:
   percent by weight, C: exceeding 0 to 0.03% or less, Si: exceeding 0 to 1.7% or less, Mn: 1.5 to 3.5%, Cr: 15.0 to 18.0%, Ni: 7.0 to 9.0%, Cu: 1.0 to 4.0%, Mo: exceeding 0 to 0.03% or less, P: exceeding 0 to 0.04% or less, S: exceeding 0 to 0.04% or less and N: exceeding 0 to 0.03% or less,
   and wherein the stainless steel has 160 MPa of yield strength, 480 MPa of tensile strength, 120 Hv of hardness, and 60% or more of elongation.

2. The air conditioner according to claim 1, wherein a filling amount of the refrigerant is 7.7 kg.

3. The air conditioner according to claim 1, wherein the ductile stainless steel pipe has an austenite matrix structure and an average diameter of 30 μm to 60 μm, and
   wherein an American Society for Testing and Material (ASTM) grain size No. of the ductile stainless steel pipe is 5.0 to 7.0.

4. The air conditioner according to claim 1, wherein the refrigerant pipe comprises a suction pipe configured to guide suction of the refrigerant to the compressor, and
   wherein the suction pipe has an outer diameter of 22.20 mm and a maximum inner diameter of 21.06 mm.

5. The air conditioner according to claim 1, wherein the refrigerant pipe comprises a discharge pipe configured to guide discharge of the refrigerant from the compressor, and
   wherein the discharge pipe has an outer diameter of 15.88 mm and a maximum inner diameter of 15.06 mm.

6. The air conditioner according to claim 1, wherein the compressor is an inverter scroll compressor.

* * * * *